US012265579B2

(12) United States Patent
Sirkin et al.

(10) Patent No.: US 12,265,579 B2
(45) Date of Patent: Apr. 1, 2025

(54) CONTROL SYSTEM FOR CONTROLLING MANAGEMENT AND TAGGING OF DIGITAL CARDS STORED IN DECENTRALIZED CONTENT STORAGE

(71) Applicant: Microsoft Technology Licensing, LLC, Redmond, WA (US)

(72) Inventors: Rachel Elizabeth Sirkin, Seattle, WA (US); Helen Marie Anderson, Seattle, WA (US); Krunal Mayank Sheth, Sammamish, WA (US); Ying Zhe Chong, Seattle, WA (US); Salil Das, Seattle, WA (US); Jacob Scott Noyes, McFarland, WI (US); Rodrigo Fernandes de Souza, Oceanside, CA (US); Peter Loren Engrav, Seattle, WA (US); Pooja Srinivas Kankanhalli, Pleasanton, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/943,760

(22) Filed: Sep. 13, 2022

(65) Prior Publication Data

US 2024/0086467 A1 Mar. 14, 2024

(51) Int. Cl.
*G06F 16/907* (2019.01)
*G06F 16/901* (2019.01)
*G06F 16/9035* (2019.01)
*G06F 16/904* (2019.01)

(52) U.S. Cl.
CPC ........ *G06F 16/907* (2019.01); *G06F 16/9024* (2019.01); *G06F 16/9035* (2019.01); *G06F 16/904* (2019.01)

(58) Field of Classification Search
CPC ............... G06F 16/907; G06F 16/9024; G06F 16/9035; G06F 16/904
USPC ................ 707/722, 737, 758, 797, 798, 803
See application file for complete search history.

(56) References Cited

U.S. PATENT DOCUMENTS

| 5,600,827 | A | * | 2/1997 | Nakabayashi | .......... | G06F 16/26 |
| | | | | | | 707/999.002 |
| 8,838,485 | B2 | | 9/2014 | Kiarostami | | |
| 11,552,799 | B1 | | 1/2023 | Parikh | | |
| 2005/0033719 | A1 | | 2/2005 | Tirpak et al. | | |
| 2007/0113271 | A1 | | 5/2007 | Pleunis | | |
| 2008/0313119 | A1 | | 12/2008 | Leskovec et al. | | |

(Continued)

OTHER PUBLICATIONS

"International Search Report and Written Opinion Issued in PCT Application No. PCT/US23/019051", Mailed Date: Jul. 10, 2023, 11 Pages.

(Continued)

*Primary Examiner* — Phong H Nguyen
(74) *Attorney, Agent, or Firm* — RAY QUINNEY & NEBEKER P.C.; Paul N. Taylor

(57) ABSTRACT

A reference to a digital item is stored as a digital card. The digital card can also be contained in, and/or refer to, other digital cards. The digital card can also include properties or attributes that may be added from the digital item that is being referred to. The digital card can be tagged with a tag that may also be applied to other digital cards. The digital card can be stored in a data pod within a de-centralized data storage system architecture so the tag is surfaced along with the digital card in different contexts.

19 Claims, 30 Drawing Sheets

(56) References Cited

U.S. PATENT DOCUMENTS

| | | |
|---|---|---|
| 2010/0076962 A1 | 3/2010 | Doyle |
| 2010/0306247 A1 | 12/2010 | Sidman |
| 2012/0147055 A1 | 6/2012 | Pallakoff |
| 2013/0290256 A1 | 10/2013 | Barrall et al. |
| 2017/0038935 A1* | 2/2017 | Matsushima ........... G06F 40/14 |
| 2017/0169065 A1 | 6/2017 | Darcy |
| 2019/0188411 A1 | 6/2019 | Kroutik |
| 2019/0303509 A1* | 10/2019 | Greene ............... G06F 16/9038 |
| 2019/0303893 A1 | 10/2019 | Ramasamy |
| 2019/0369979 A1 | 12/2019 | Woods |
| 2019/0386969 A1 | 12/2019 | Verzun et al. |
| 2020/0117818 A1 | 4/2020 | Latka |
| 2020/0134064 A1* | 4/2020 | Guha ...................... G06F 16/13 |
| 2020/0143015 A1 | 5/2020 | Lebeau |
| 2020/0143367 A1 | 5/2020 | Lebeau |
| 2020/0233878 A1* | 7/2020 | Huang .................. G06F 3/0482 |
| 2020/0250217 A1* | 8/2020 | Abhyankar ............. G06N 5/04 |
| 2021/0174911 A1 | 6/2021 | Sharda |
| 2021/0312078 A1 | 10/2021 | Jayachandran |
| 2021/0326223 A1 | 10/2021 | Grunwald |
| 2021/0397653 A1 | 12/2021 | Russell et al. |
| 2022/0358241 A1 | 11/2022 | Palakodety |
| 2023/0088936 A1 | 3/2023 | Chalkley |
| 2023/0306547 A1 | 9/2023 | Patel |
| 2023/0316261 A1 | 10/2023 | Agbamu |
| 2023/0401178 A1 | 12/2023 | Das |
| 2023/0401212 A1* | 12/2023 | Das ..................... G06F 16/9024 |

OTHER PUBLICATIONS

"International Search Report and Written Opinion Issued in PCT Application No. PCT/US23/019052", Mailed Date: Aug. 4, 2023, 11 Pages.

Non-Final Office Action mailed on Jan. 4, 2024, in U.S. Appl. No. 17/839,012, 18 pages.

Non-Final Office Action mailed on Jan. 31, 2024, in U.S. Appl. No. 17/839,003, 21 pages.

U.S. Appl. No. 17/839,003, filed Jun. 13, 2022.

U.S. Appl. No. 17/839,012, filed Jun. 13, 2022.

Notice of Allowance mailed on May 29, 2024, in U.S. Appl. No. 17/839,012, 08 pages.

Final Office Action mailed on Jul. 18, 2024, in U.S. Appl. No. 17/839,003, 15 pages.

Notice of Allowance mailed on Sep. 23, 2024, in U.S. Appl. No. 17/839,012, 08 pages.

Notice of Allowance mailed on Sep. 27, 2024, in U.S. Appl. No. 17/839,003, 12 pages.

* cited by examiner

FIG. 18

| Shared | | | Filtered by keyword | ☰ Filter ⌄ |
|---|---|---|---|---|
| Name | | Shared ▶ | Shared by | Activity |
| Chat | Metafolder Design Release | 2h ago | Gabe | 🖥 You shared this in a teams chat |
| Doc. | Gabe and Alyx chat | 6h ago | Gabe | |
| Present-ation | Taking action in Loop | Yesterday at 5:13 pm | Nicole | 👤 User  Nicole shared this with you |
| | ... | | | |

| Recently opened | | | Filtered by keyword ☰ Filter ⌄ |
|---|---|---|---|
| Name | Opened ▶ | Owner | Activity |
| Chat: Metafolder Design Release | 2h ago | Gabe | 🖥️ You shared this in a teams chat |
| Doc.: MetaFolder – Everything is a card | 6h ago | Lyla | 👤 Gabe shared this with you |
| Present-ation: MetaFolder – Initial Design | 3 days ago | Mary | 👤 Nicole replied to comment |
| ... | | | |

| Recently opened | | | Filtered by keyword | Filter ⌵ |
|---|---|---|---|---|
| Name | | Modified ▼ | Owner | Activity |
| Chat | Metafolder Design Release | 2h ago | Gabe | 🖥️👤 You shared this in a teams chat |
| Present-ation | Name | 6h ago | Mary | 👤 Gabe shared this with you |
| Doc. | Name | Yesterday at 6:29 pm | Magdalena | 👤 Nicole replied to comment |
| | ... | | | |

| Browse by meetings | | Filtered by keyword | ≡ Filter ∨ |
|---|---|---|---|
| Name | Start time ▶ | | |
| Metafolder Design Release | Fri at 2:35 | | |
| Kick-Off | Wed at 3:00 PM | | |
| Gab & Alyx Chat | Feb 24 | | |
| ... | | | |

CONTROL SYSTEM FOR CONTROLLING MANAGEMENT AND TAGGING OF DIGITAL CARDS STORED IN DECENTRALIZED CONTENT STORAGE

BACKGROUND

Computing systems are currently in wide use. Some such computing systems allow application developers to build applications that can be run in various different contexts.

Such applications often operate on, and use, data that is stored in a central database. The application calls a central database service and uses that service to store information at a central location, which has a number of impacts. For instance, the application developer must open an account and spin up the database service in order to store and access data in the database service. Similarly, it can be difficult to move the data from the central database service location, without deleteriously affecting the application and without being cumbersome for the application developer.

The discussion above is merely provided for general background information and is not intended to be used as an aid in determining the scope of the claimed subject matter.

SUMMARY

A reference to a digital item is stored as a digital card. The digital card can also be contained in, and/or refer to, other digital cards. The digital card can also include properties or attributes that may be added from the digital item that is being referred to. The digital card can be tagged with a tag that may also be applied to other digital cards. The digital card can be stored in a data pod within a de-centralized data storage system architecture so the tag is surfaced along with the digital card in different contexts.

A metafolder system manages a graph that identifies activities that are performed with respect to digital cards and tags applied to the digital cards and that identifies relationships among the digital cards and the tags. The digital cards from a plurality of different locations in the de-centralized data storage system architecture can be aggregated for projection as coming from a single virtual location and based on the applied tags.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 18 is one example illustration of a projection.

FIG. 20 is one example illustration of a projection.

FIG. 21 is one example illustration of a projection.

FIG. 22 is one example illustration of a projection.

FIG. 23 is one example illustration of a projection.

DETAILED DESCRIPTION

The present description describes a system which provides a data layer that application developers or other users can use to store application metadata without having to run any servers or databases, for this specific purpose, in database systems where the data is stored. The application metadata is stored on digital cards in digital files or pods. The application developers or other users interact with a data pod accessing system (which may be a software developer kit- or SDK) to interact with the digital cards without directly accessing the data in the digital cards. The pods are stored on existing data storage systems. The existing data storage systems handle security, authentication, and access control so that the data pod accessing system need not handle all of the diverse types of security that are implemented by those different types of data storage systems. The digital cards can be extended by different users or application developers and stored in decentralized locations. The digital cards can be tagged automatically or manually and the cards can be sorted or otherwise filtered based on the tags. A metafolder system tracks relationships among digital cards and tags. The metafolder system also tracks activities performed with respect to a digital card. A projection generation system can aggregate digital cards from multiple pods in the decentralized system and present the aggregated digital cards to a user as coming from a single virtual location, and sorted or otherwise based on the tags.

Figure 1:
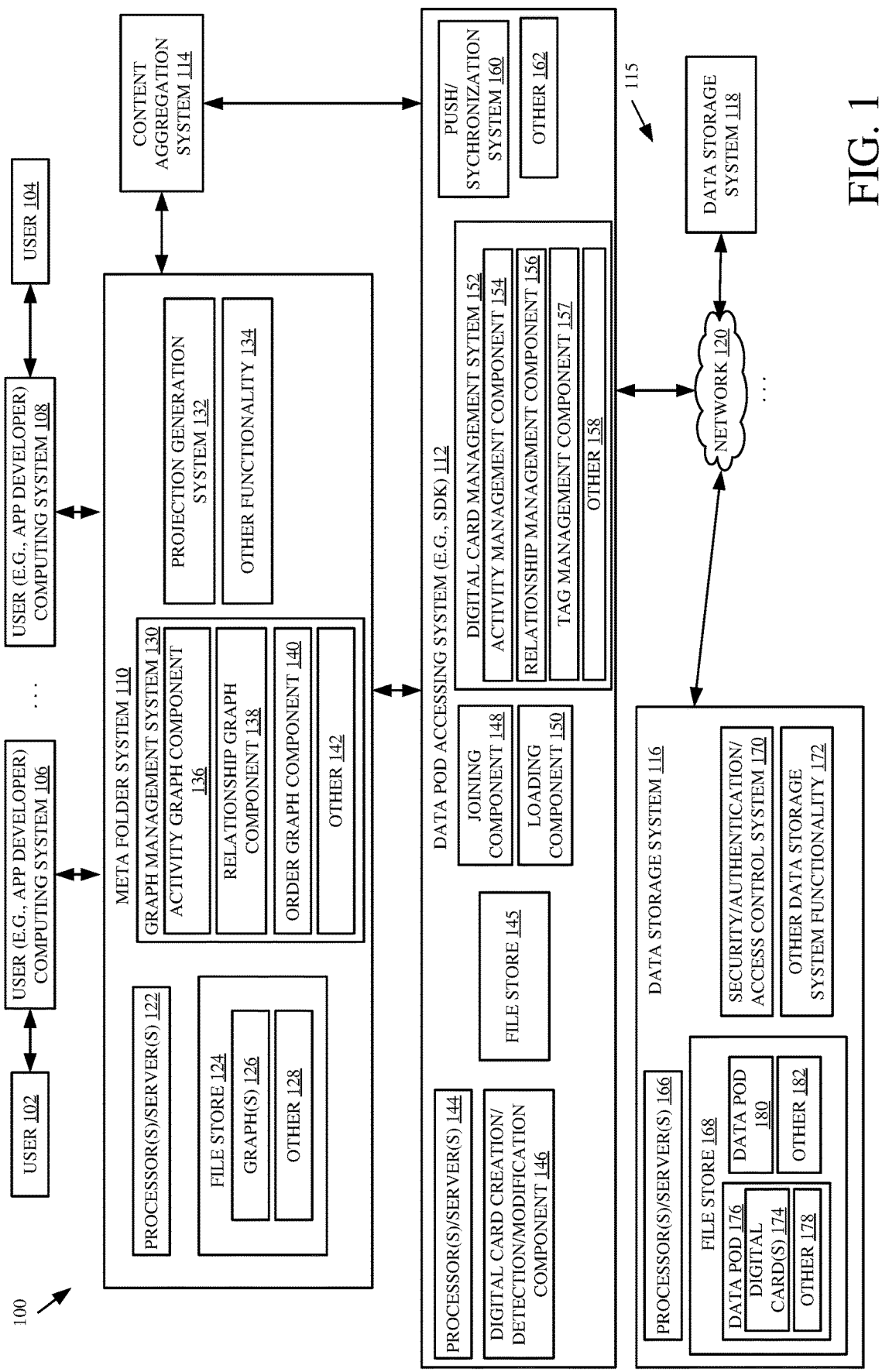
FIG. 1 is a block diagram of one example of a computing system architecture.

FIG. 1 is a block diagram of one example of a computing system architecture 100 in which a plurality of different users 102-104 (which may be application developers or other users) use corresponding user computing systems 106-108 to access and interact with data stored on a plurality of different data storage systems 116-118 in a decentralized data storage system architecture 115, without needing to directly interact with data storage systems 116-118.

Computing system architecture 100 also includes metafolder system 110, data pod accessing system (which may be a software developer kit or SDK or other functionality that enables creation of digital cards, storage of digital cards, and access to digital cards) 112, content aggregation system 114. In the example shown in FIG. 1, data pod accessing system 112 has access to data storage systems 116-118 over network 120. Network 120 can be a wide area network, a local area network, a cellular network, a Wi-Fi network or any of a wide variety of networks or combinations of networks. Data pod accessing system 112 exposes an interface which can be accessed by metafolder system 110 and/or user computing systems 106 and 108. The interface can be used to create digital cards which are digital representations of other heterogeneous digital items. The digital cards refer to those digital items and include metadata from the digital items and may include tags or different properties that users or developers can add, or that can be automatically added, and other information. By automatically it is meant, for example, that the action of functionality can be performed without further human involvement except, perhaps, to initiate or authorize the action or function. Data pod accessing system 112 stores digital pods (which can each contain a plurality of digital cards) on data storage systems 116-118 each of which may be any of a wide variety of different types of data storage systems that can be distributed and decentralized. The interface exposed by data pod accessing system 112 can also be used to retrieve digital cards from different pods in data storage systems 116-118 and aggregate them (such as by joining them) or sorting them or otherwise processing them. Metafolder system 110 can be used to present a view of the digital cards joined from different pods in the decentralized architecture 115 to a requesting user 102-104 as if the digital cards come from a single virtual location or data store. Data pod accessing system 112 may also expose an interface that allows users 102-104 to add digital cards within other digital cards and to express relationships between the digital cards. In addition, users 102-104 can perform activities with respect to the digital cards. The relationships between cards and activities performed on digital cards may be stored in a graph corresponding to the digital cards by metafolder system 110. Metafolder system 110 then allows users 102-104 to query the data cards, to view them in different projections, to tag the digital cards with different tags, to add priority metadata to a digital card, and to perform other activities described in greater detail below. Before describing the overall operation of architecture 100 in more detail, a description of some of the items in architecture 100, and their operation, will first be provided.

Metafolder system 110 includes one or more processors or servers 122, and file store 124, which may store graphs 126 and other information 128. System 110 can also include graph management system 130, projection generation system 132, and other functionality 134. Graph management system 130 can include activity graph component 136, relationship graph component 138, order graph component 140, and other items 142. Pod data accessing system 112 can include one or more processors or servers 144, file store 145, digital card creation/deletion/modification component 146, joining component 148, loading component 150, digital card management system 152 (which can include activity management component 154, relationship management component 156, tag management component 157, and other items 158), push/synchronization system 160, and other functionality 162.

Data storage systems 116-118 can be similar or different. For purposes of the present discussion, it will be assumed that they are similar so that only data storage system 116 is described in greater detail. Data storage system 116 illustratively includes one or more processors or servers 166, file store 168, security/authentication/access control system 170, and other data storage system functionality 172. File store 168 can store a plurality of digital cards 174 as files in a file structure referred to as data pod 176. The data pod 176 can include other items 178 as well. File store 168 can also store other data pods 180 and other information 182. When a request is received for a digital card 174, security/authentication/access control system 170 performs the security operations to control user authentication, access control, and other security measures for accessing the requesting digital card 174. In doing so, system 170 may use external systems, such as token issuing systems, external authentication systems, etc. Suffice it to say that the data storage system 116, where the requested digital card 174 is stored, handles all of the security, authentication, access control, etc. functionality for providing access to that digital card so that data pod accessing system 112 need not handle that functionality except, perhaps, to provide the identity of the requesting user, any tokens provided by the user computing system, etc.

A user 102 can provide an input indicating that the user 102 wishes to create a digital card representing an underlying digital item. The underlying digital items for which digital cards can be created can include a wide variety of different types of digital items (e.g., heterogeneous digital items), such as a document, a message, a website, a drawing, digital items generated by meeting systems, or a wide variety of other digital items. In response to the user input, content aggregation system 114 obtains metadata from the underlying digital item and provides the metadata to digital card creation/deletion/modification component 146. Component 146 creates the digital card (which has the same structure as—is homogenous with respect to—other digital cards, even though the underlying digital item is a different type of digital item than—is heterogenous with respect to—those represented by the other digital cards) and outputs the digital card for storage on one of data storage systems 116-118. The data storage system holding the data pod (which can be a personal data pod that is personal to a user or a shared data pod) where the digital card is to be stored handles the specific storage operation.

A user can also provide an input indicating that the user wishes to review the digital card representing the underlying digital item. In that case, loading component 150 identifies the digital card representing that item and loads the digital card. In some examples, the user may request to view an aggregation of multiple different digital cards, in which case loading component 150 loads all of those digital cards. In doing so, loading component 150 provides the request to the set of data storage systems 116-118, and data storage systems 116-118, themselves, handle the authentication and authorization and other security or access control functions corresponding to the digital cards. Joining component 148 then joins the information from the different digital cards (obtained from the decentralized data storage systems architecture 115), so that the information can be presented to the requesting user as if it comes from a single data storage location.

Digital card management system 152 allows users to manage the digital cards, such as performing activities with respect to the digital cards and generating relationships with respect to the digital cards. For instance, user 102 may generate a digital card and share that digital card with user 104. In that case, activity management component 154 provides an indication to metafolder system 110 that the digital card has been shared. The activity management component 154 may also provide an indication of the actor (user 102) who performed the activity and the recipient (user 104) who received the results of the activity. There also may be instances where a user wishes for one digital card to contain a reference to another digital card in which case the first digital card (which contains the second digital card) may have a "contain" relationship with respect to the second digital card (the digital card that is contained within the first digital card). The second digital card may, itself, contain other digital cards, and so on. Relationship management component 156 handles the relationship modifications. Digital card management system 152 modifies the data structure of the digital card and provides outputs to metafolder system 110 indicating the activity, relationship changes, etc., that have been performed with respect to the digital card.

Tag management component 157 includes functionality that allows a user or automated system to tag the digital cards with one or more different tags and add other metadata to the digital card through tags such as pinning the digital card on a display (or providing other priority (or sort order) information corresponding to the digital card). In one example, the metadata can include context dependent data. For example, the sort order metadata may indicate that when the calling application is a first application in a first context (a browser) the tagged digital cards are to be sorted and displayed in a first sort order, but when the calling application is a second application in a second context (such as an email application) then the tagged digital cards can be sorted and displayed in a second sort order. Tag management component 157 can be used to add other metadata to a tag or a digital card as well, some of which is described elsewhere herein.

When a user makes a change to a digital card, push/synchronization system 160 pushes the changes to the different digital cards that are affected by the change in data storage systems 116-118.

Graph management system 130 in metafolder system 110 maintains one or more graphs corresponding to the digital cards. The graphs can be used to query the digital cards and generate projections using the digital cards. Activity graph component 136 generates a graph element indicative of activities that are performed with respect to a digital card (such as sharing or opening a digital card). Relationship graph component 138 generates a graph element on the graph indicative of the relationships among the different digital cards and among tags and the digital cards. For instance, when a tag is applied to a digital card (manually or automatically) a node is created in the graph corresponding to the tag and a "tagged" relationship is created in the graph between the node representing the digital card and the node representing the tag. Order graph component 140 maintains an order in which the digital cards have been created, modified, deleted, etc. The graphs are stored as graphs 126 (which may be directed acyclic graphs—DAGs, or other graph structures) in file store 124, and the graphs 126 can be queried so that projection generation system 132 can generate a projection corresponding to the digital cards.

Order graph component 140 can access or generate a time stamp corresponding to each activity and relationship, such as when a particular digital card was created or deleted, when the digital card was modified, when a relationship was added to another digital card or to a tag, when an activity was performed with respect to a digital card, etc. The digital cards can be ordered in terms of the time stamps or the digital cards can be queried in terms of the time stamps, or the time stamps can be used in other ways as well.

Figure 2:
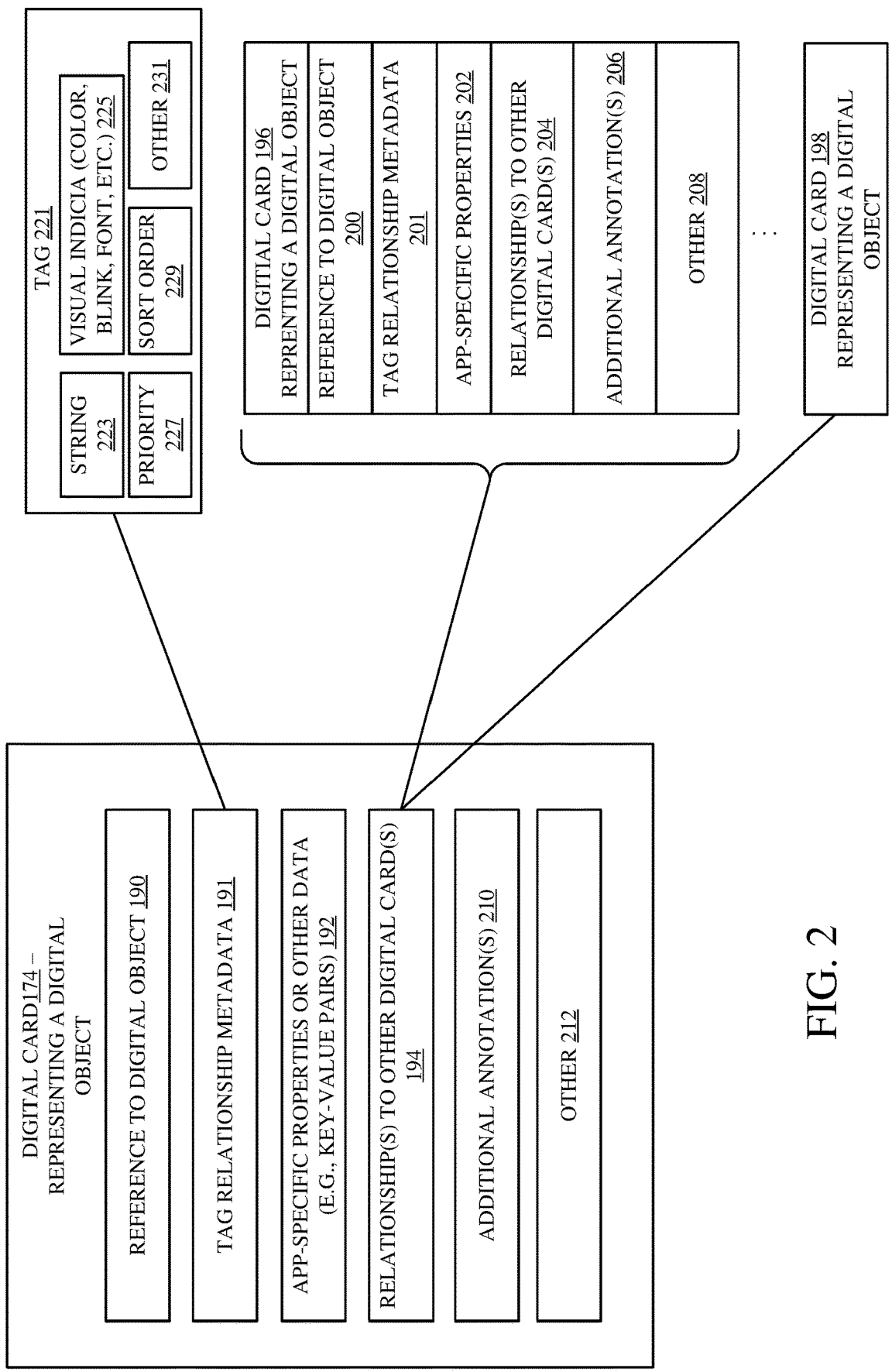
FIG. 2 shows a block diagram of one example of a digital card.

FIG. 2 shows one example of a digital card 174. A digital card 174 may include reference to an underlying digital item, such as a file, website, drawing, object from a meeting system or electronic mail system, etc. Once a user provides an input indicating that a digital card is to be made to represent a particular digital item, content aggregation system 114 extracts or otherwise obtains metadata from the digital item. The metadata is included in the digital card 174 to represent the underlying digital item. In one example, digital card 174 includes a reference to the digital item, such as a URL or other reference, as indicated by block 190. Digital card 174 can also include tag relationship metadata 191 which identifies a "tagged" relationship to a tag 251. The digital card 174 can also include application-specific properties which may be represented as key value pairs 192 and other items 212.

In the example shown in FIG. 2, tag 221 is configured or identified with a string 223, visual indica 225 (such as a color, a blinking pattern, a font, or other visual indica that distinguishes the tag 221 from other tags), a priority indicator 227 (such as a pin indicator or other indicator showing the priority of tag 221 relative to other tags), sort order metadata 229 (which may be context-dependent so that the order in which tagged digital cards are sorted may vary depending on the context of the application calling for the digital cards), and other metadata 231.

Digital card 174 can also include relationship indicators 194 which show relationships to other digital cards 196-198. The relationship indicators 194 may indicate that digital card 174 contains other cards 196-198, as well as an identifier that identifies the other cards 196-198. Each of the digital cards 196-198 may, themselves, represent digital items and include a reference 200 to the digital item, application-specific properties 202, relationship indicators that identify relationships to still other digital cards 204, and additional annotations 206, as well as other items 208.

Figure 3:
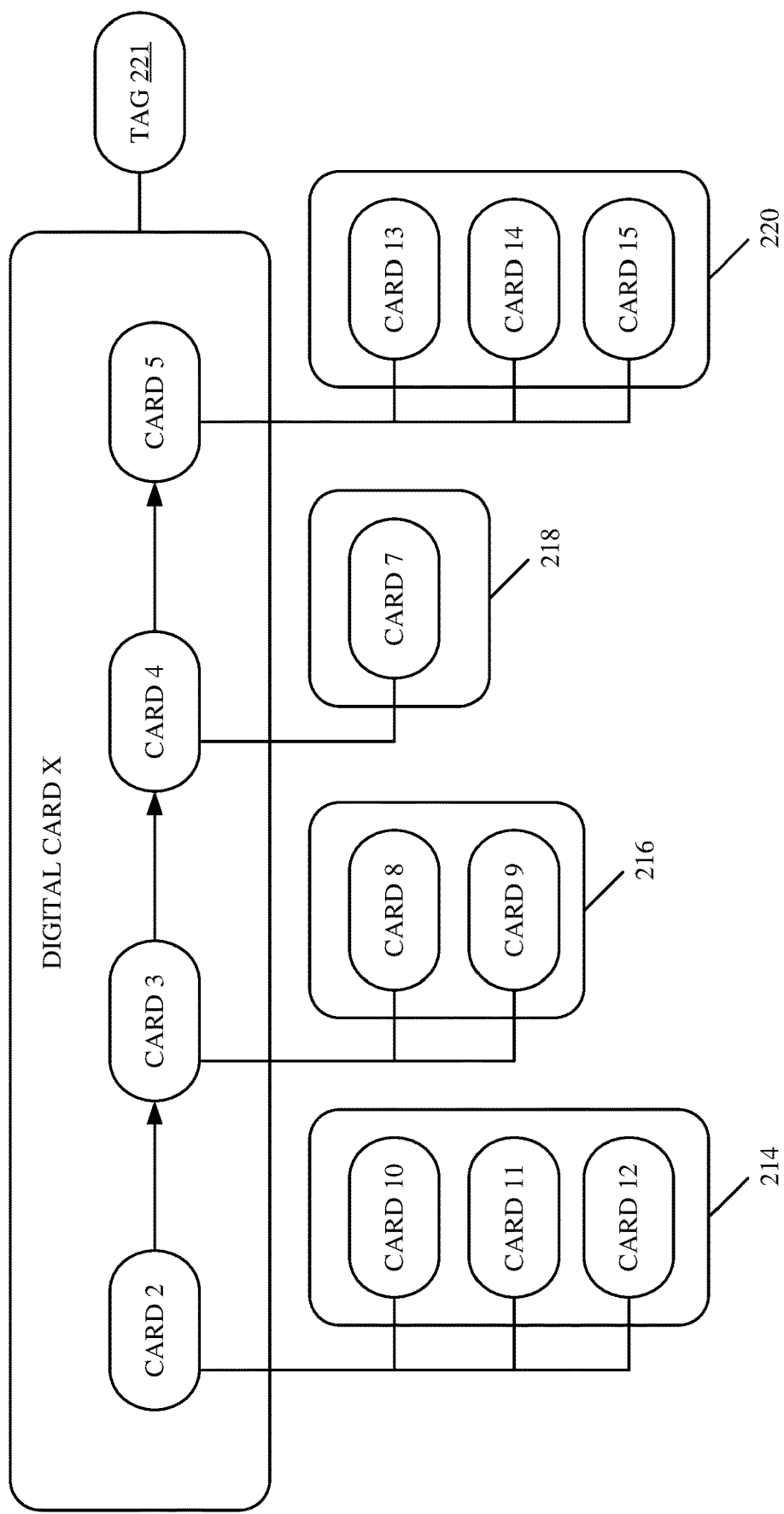
FIG. 3 and FIG. 4 show examples of graph structures.
Figure 4:
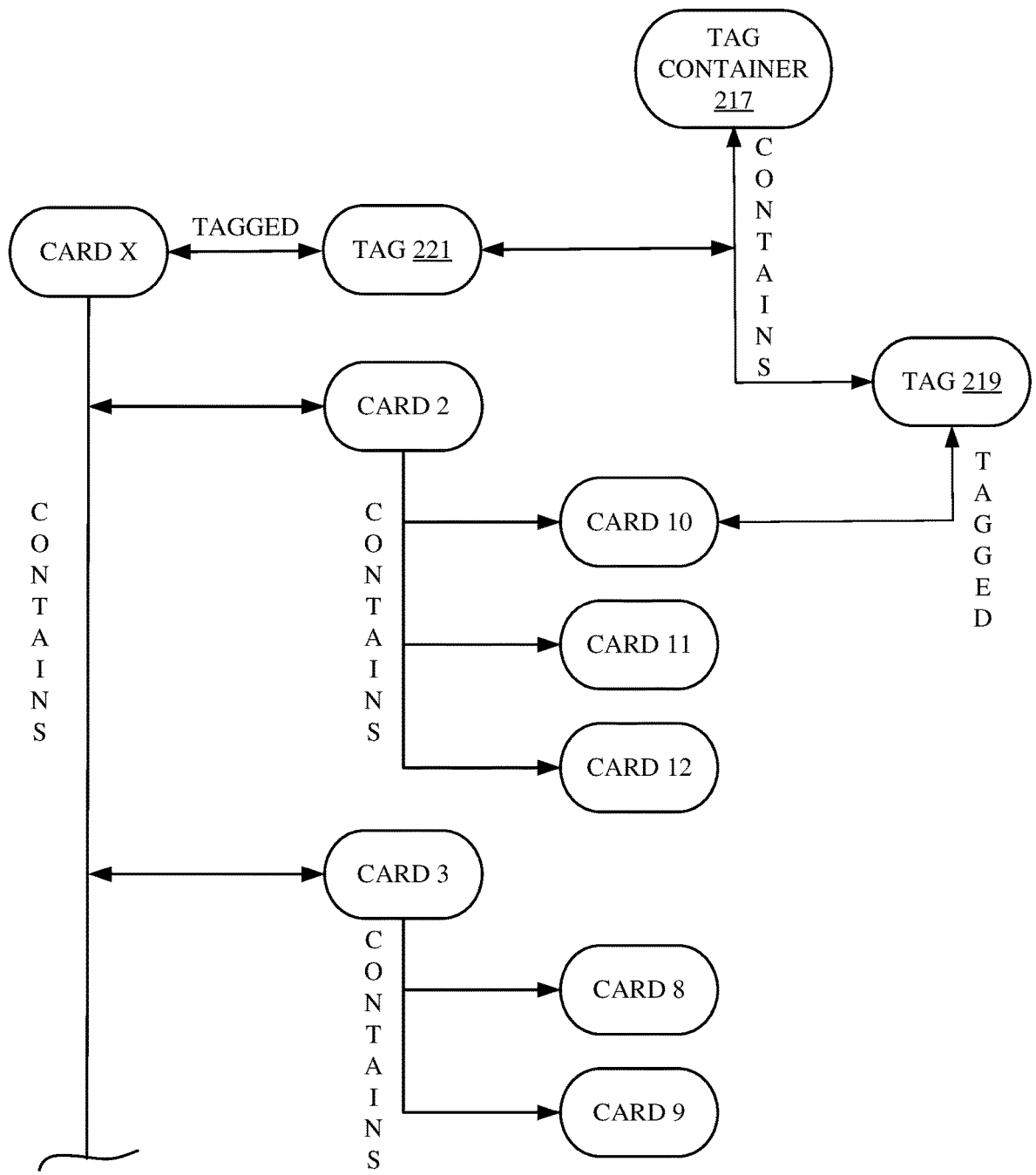

FIGS. 3 and 4 show two different representations of graph structures that can be used to represent graphs 126 in metafolder system 110. FIG. 3 shows a graph structure that includes a first digital card X that contains a plurality of other digital cards (or has relationship indicators 194 identifying the other digital cards shown in FIG. 2) and that has tag relationship metadata 191 identifying relationships to one or more tags 221. In FIG. 3, digital card X contains digital card 2, digital card 3, digital card 4, and digital card 5. FIG. 3 also shows that digital card X has been tagged with tag 221. FIG. 3 also shows that digital card 2 may, itself, contain a collection 214 of other digital cards including digital card 10, digital card 11, and digital card 12. FIG. 3 shows that digital card 3 may include a collection 216 of other digital cards including digital card 8 and digital card 9. Digital card 4 may include a collection 218 comprising digital card 7. Digital card 5 may include a collection 220 of other digital cards, which includes digital card 13, digital card 14, and digital card 15. Thus, the cards in collection 214 may be referred to as child cards of the parent digital card 2 which may be referred to, itself, as a child of the parent digital card X. Similarly, the cards in collection 216 may be referred to as children of card 3 which, itself, may be referred to as a child of card X. The same may be true of the digital cards in collection 218 and 220. Any of the cards shown in FIG. 3 can be tagged with one or more tags, and having digital card X tagged with tag 221 is just one example.

FIG. 4 shows a diagram of another structure that can be used to represent graphs 126. FIG. 4 specifically shows that the relationship among the different cards is identified as a "contains" relationship. Therefore, in FIG. 4, it can be seen that card X "contains" card 2 and card 3. Similarly, card 2 "contains" card 10, card 11 and card 12 while card 3 "contains" cards 8 and 9. In one example, the "contains" relationship is identified in the relationship indicators 194 that identify relationships to other digital cards shown in FIG. 2. Therefore, when card X has a relationship identifier 194 that identifies card 2, then it can be determined that card X "contains" card 2. Thus, the "contains" relationship keeps an indirect reference indicating whether a card belongs to more than one other cards and allows a direct reference from a single card to discover what the parents are of that single card. In one example, a single digital card can have only a single direct parent. References to a particular digital card may be held in multiple other digital cards, but the particular digital card may be represented only once on a particular data store 116-118.

FIG. 4 shows that card X is related to tag 221 by a "tagged" relationship. The tagged relationship can be identified in the tag relationship metadata 191 shown in FIG. 2. Therefore, when digital card X has a "tagged" relationship with tag 221, then it can be determined that digital card X is "tagged" by tag 221. A digital card may have a "tagged" relationship with a plurality of different tags. Also, multiple different digital cards can have a "tagged" relationship with the same tag. Thus, digital cards can be searched and sorted based on their tags.

FIG. 4 also shows that the graph 126 can include tag container 217 which is in a "contains" relationship relative to tags 221 and 219. FIG. 4 also shows that while card X has been tagged with tag 221 (because it is in a "tagged" relationship with respect to tag 221) card 10 has been tagged with tag 219 (because it is in a "tagged" relationship with respect to tag 219).

Figure 5A:
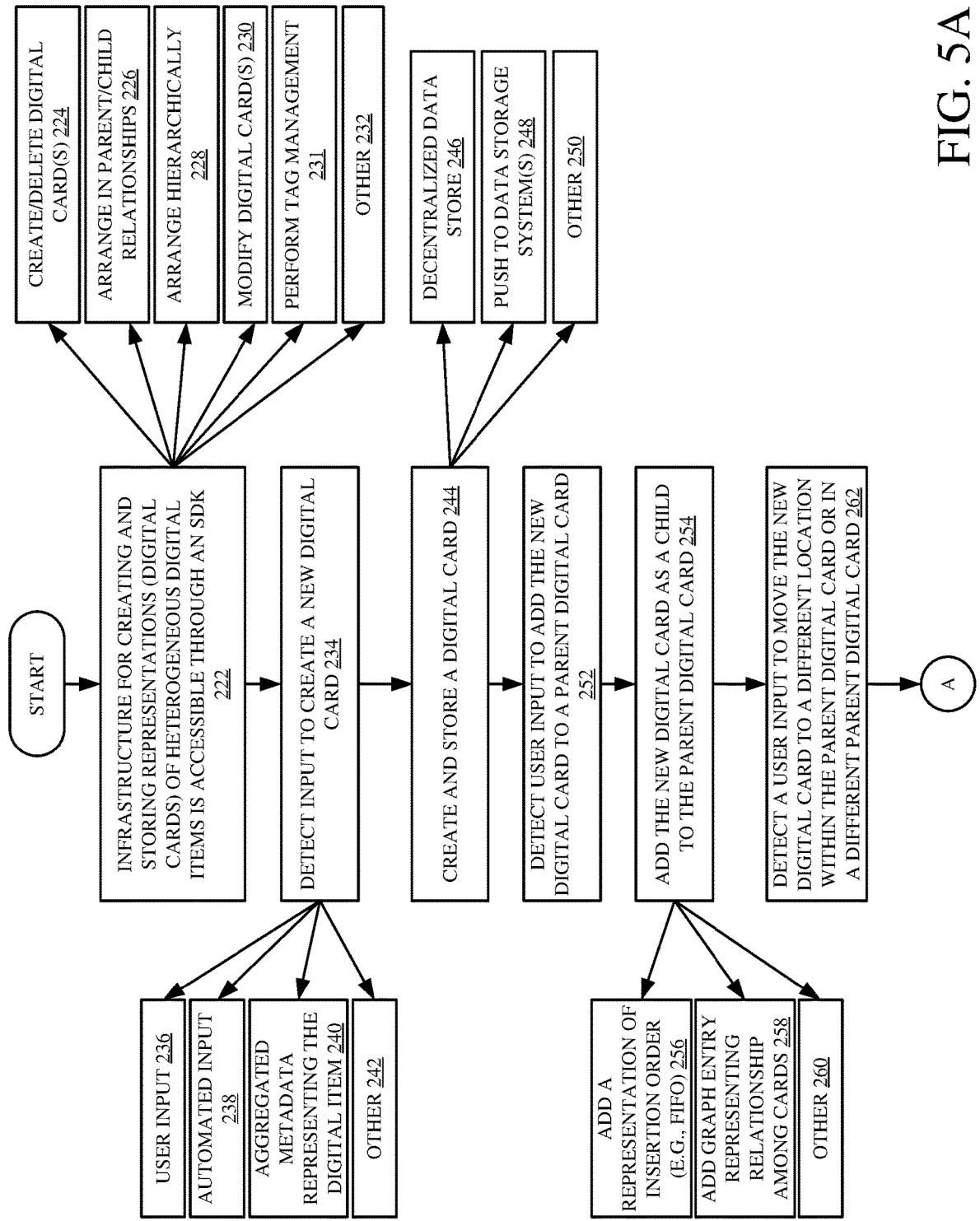
FIGS. 5A, 5B, and 5C (collectively referred to herein as FIG. 5), show one example of the operation of the computing system architecture.
Figure 5B:
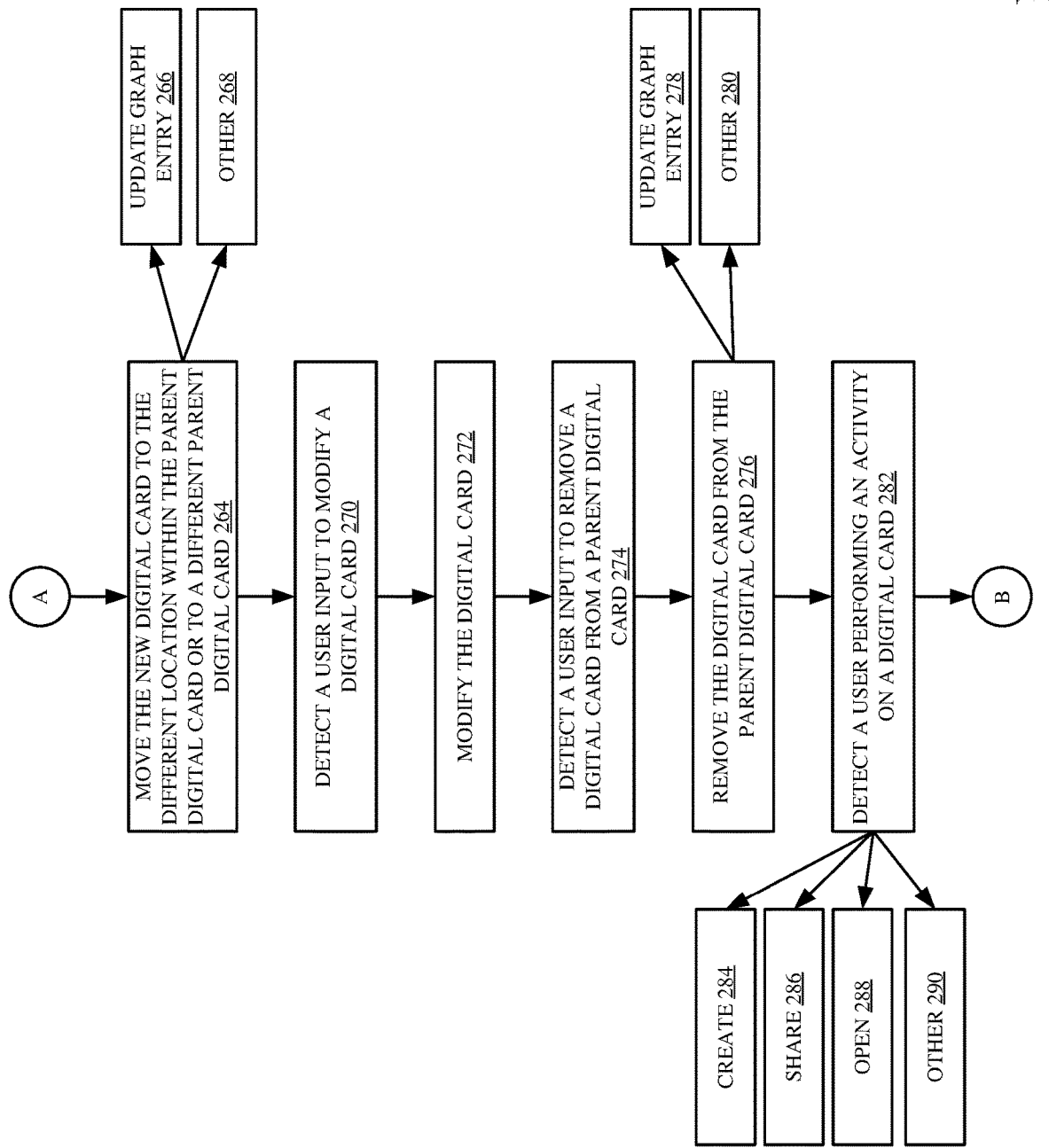
Figure 5C:
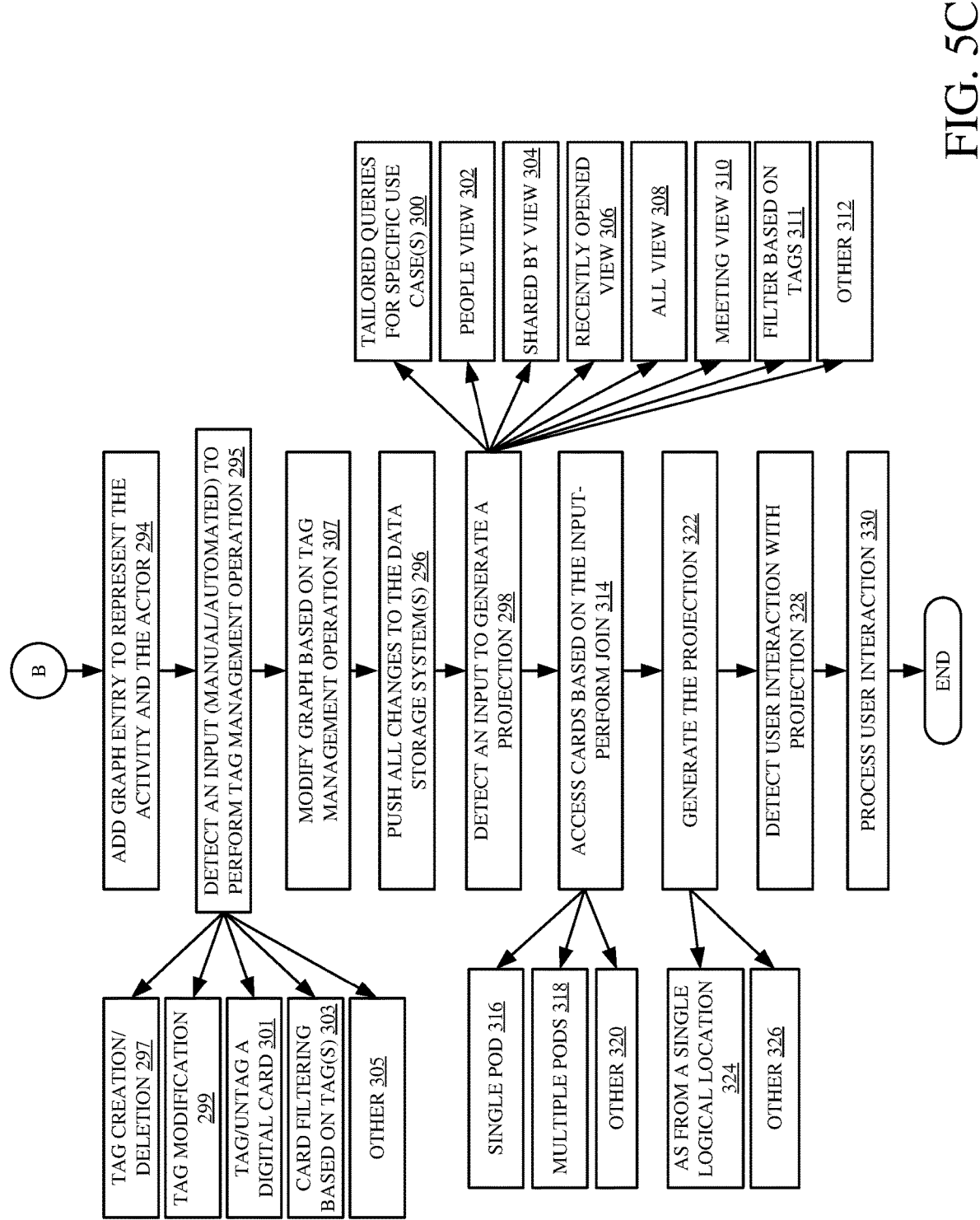

FIGS. 5A, 5B, and 5C (collectively referred to herein as FIG. 5) show a flow diagram illustrating one example of the operation of computing system architecture 100. In the example shown in FIG. 5, it is first assumed that the infrastructure for creating and storing representations (digital cards) of heterogeneous digital items is accessible through data pod accessing system (e.g., SDK) 112. Having the infrastructure in place is indicated by block 222 in the flow diagram of FIG. 5. The infrastructure illustratively allows a user or another computing system to create or delete digital cards, as indicated by block 224. The infrastructure illustratively allows the arrangement of the digital cards in the "contains" (e.g., parent/child) relationships or other relationships as indicated by block 226. The infrastructure allows the digital cards to be arranged or queried in hierarchical order (such as when the digital cards were created or deleted or modified, when activities where performed on them, etc.) as indicated by block 228. The infrastructure illustratively allows the computing system to modify digital cards, as indicated by block 230 and/or to perform tag management with respect to a digital card, as indicated by block 231, and/or to perform a wide variety of other functions with respect to digital cards, as indicated by block 232.

Metafolder system 110 (or data pod accessing system 112, where it is directly accessible by client computing systems 106-108) then detects an input to create a new digital card, as indicated by block 234 in the flow diagram of FIG. 5. The request is provided to digital card creation/deletion/modification component 146. The request may be a user input 236 or an automated input 238. In one example, the request may be provided to content aggregation system 114 which aggregates the metadata that will be used to create the digital card for the underlying digital item. Thus, the request may be input along with the metadata or the metadata can be obtained after the request is received, based upon the request. Obtaining the aggregated metadata representing the underlying digital item is indicated by block 240 in the flow diagram of FIG. 5. The request to create a new digital card may be received in other ways and include other information as well, as indicated by block 242.

Digital card creation/deletion/modification component 146 then creates a digital card, such as digital card 174 shown in FIG. 2, and outputs it for storage in one or more of decentralized data storage systems 116-118, as indicated by block 244. The push/synchronization system 160 may push the information corresponding to the newly created digital card to the decentralized data storage systems, or it may be provided in other ways. Storing the digital card on a decentralized data storage system is indicated by block 246. Pushing the data to the one or more storage systems is indicated by block 248. The digital card can be created and stored in other ways as well, as indicated by block 250. Creating a new digital card is discussed in greater detail below with respect to FIG. 6.

At some point, data pod accessing system 112 detects or receives a user input indicating that the user wishes to generate a relationship between digital cards, such as to add the new digital card, as a child digital card to a parent digital card, as indicated by block 252 in the flow diagram of FIG. 5. Again, the request may be received through metafolder system 110, or directly from computing systems 106-108.

Relationship management component 156 then adds the newly created digital card as a child to the parent digital card that is identified in the request, as indicated by block 254. Adding a digital card as a child in a parent digital card is described in more detail below with respect to FIG. 7. In one example, relationship management component 156 also generates a time stamp or other indicator indicating a representation of the order in which the newly created digital card was inserted into the parent digital card, relative to other child digital cards in that parent digital card. Adding a representation of the insertion order is indicated by block 256. The relationship management component 156 then provides an indication that the newly created digital card was inserted as a child in a parent digital card to graph management system 130. Relationship graph component 138 generates an entry in the graph 126 corresponding to the parent digital card and the newly created digital card. The graph entry is indicative of the relationship between the parent and child digital cards (e.g., the "contains" relationship). Generating the graph entry is indicated by block 258 in the flow diagram of FIG. 5. The new digital card can be added to a parent digital card, as a child, in other ways as well, as indicated by block 260.

At some point, a user may also provide an input indicating that the user wishes to move the new digital card to a different location either within the current parent digital card or in a different parent digital card, as indicated by block 262. By way of example, and referring again to FIG. 4, it may be that the user provides an input indicating that card 3 should be relocated from its current location (its source location) to a position above card 2 within the parent card X (its destination location). In another example, the user may request that card 3 be removed from its position in parent card X (its source location) and inserted as a child to a different card, such as into card 12 (its destination location). These are just examples of a request that may be received to reposition a digital card within a parent or to another parent.

In response to the request, relationship management component 156 moves the new digital card from its source location to the destination location within the parent digital card, or to a destination location in a different parent digital card altogether. In one example, moving the new digital card to a different location within the parent may be indicated by changing the order that the relationship indicator 194 (in FIG. 2) is inserted, among the other relationship indicators 194, in the parent card 174. In another example, the relationship indicator for the new digital card may be removed from the parent digital card 174 and placed in another parent digital card as a relationship indicator 194 in that parent digital card. Moving the new digital card from its source location to a destination location is indicated by block 264 in the flow diagram of FIG. 5. Moving a digital card from a source location within a parent digital card, or to a destination location in the same or a different parent digital card, is described in greater detail below with respect to FIG. 8.

Again, relationship management component 156 can provide an output indicating the new relationship to graph management system 130. Relationship graph component 138 updates the graph 126 to identify the new relationship, and order graph component 140 indicates the time at which the relationships were changed. Updating the graph entry is indicated by block 266 in the flow diagram of FIG. 5. The new digital card can be moved from a source location to a destination location in other ways as well, as indicated by block 268.

It may also be that, at some point, data pod accessing system 112 receives an input to modify the information in a digital card, such as to add new properties, to modify property values, etc. Detecting a user input to modify a digital card is indicated by block 270 in the flow diagram of FIG. 5. Digital card creation/deletion/modification component 146 then retrieves the digital card and modifies it, as indicated by the request. Modifying the digital card based on a request is indicated by block 272 in the flow diagram of FIG. 5. Modifying a digital card is described in greater detail below with respect to FIG. 9. The modified information may be provided to push/synchronization system 160 which pushes the modification to one or more of the decentralized data storage systems 116-118.

It may also be that data pod accessing system 112 detects a user input to remove a digital card from a parent digital card, as indicated by block 274 in the flow diagram of FIG. 5. In that case, relationship management component 156 can access the parent digital card, remove a reference to the child digital card (the relationship indicator 194), or remove the digital card from the parent digital card in another ways, as indicated by block 276. Removing a digital card from a parent digital card is described in greater detail below with respect to FIG. 10. An output indicative of this modified relationship is also provided from component 156 to graph management system 130. Relationship graph component 138 then modifies the graph 126 to reflect the new or modified relationship, as indicated by block 278. A digital card can be removed from a parent digital card in other ways as well, as indicated by block 280.

It may also be that data pod accessing system 112 receives an input indicating that a user is performing an activity with respect a digital card, as indicated by block 282. Such activities may include creating a digital card as indicated by block 284, sharing a digital card with another user as indicated by block 286, opening or reading a digital card as indicated by block 288, or performing another activity 290. Activity management component 154 generates an output to graph management system 130 indicating that an activity has been performed with respect to a digital card. Activity graph component 136 then modifies the corresponding graph 126 to show the activity and an actor who performed the activity. Adding a graph entry to represent the activity and the actor is indicated by block 294 in the flow diagram of FIG. 5.

Data pod accessing system 112 may receive a user input or an automated input indicating that a tag management operation is to be performed, as indicated by block 295. The tag management operation can be to create or delete a tag as indicated by block 297, modify a tag as indicated by block 299, tag or untag a digital card as indicated by block 301, filter digital cards based on tags as indicated by block 303, or perform other tag management operations as indicated by block 305. Relationship graph component 138 then modifies the graph 126 to reflect the tag management operation as indicated by block 307. Tag management operations are described in greater detail elsewhere herein.

Again, all of the changes to the digital cards and the relationships may be pushed to the decentralized data storage system 115 by push/synchronization system 160, as indicated by block 296 in the flow diagram of FIG. 5.

Metafolder system 110 may then receive an input indicating that a user wishes to have a projection of the digital cards generated for user viewing or for consumption in other ways. Detecting an input to generate a projection is indicated by block 298 in the flow diagram of FIG. 5. The input may be an input identifying a tailored query for a specific use case, as indicated by block 300. Such queries can be used to generate a "people" view 302, a "shared by" view 304, a "recently opened" view 306, an "all" view 308, a "meeting" view 310, a filtered view based on tags assigned to the digital cards as indicated by block 311, or any of a wide variety of other views 312. Generating a projection, and some example projections that may be generated, are described in greater detail below with respect to FIGS. 18 and 20-24. In response to the request to generate a projection, the digital cards are accessed and loaded by loading component 150 and the information from those cards is joined together by joining component 148. The joined information is then provided to projection generation system 132 which generates the projections.

Accessing the digital cards is indicated by block 314 in FIG. 5. It will be noted that the digital cards may be accessed from a single pod 316, or from multiple pods spread out across the decentralized storage systems 115 as indicated by block 318, or from other locations 320. It should also be noted that the data storage systems 116-118, where the pods are stored, themselves perform the security/authentication/access control on the digital cards in the pods so that such processing need not be performed by data pod accessing system 112 or metafolder system 110. Instead, such processing is left to the storage system, itself, where the pods are stored. Generating the projection is indicated by block 322. In one example, the projection is generated so that the multiple digital cards appear to be stored on a single logical location 324. The projection can be generated in a wide variety of other ways 326 as well.

The projection may also be interactive so that the projection generation system 132 can detect user interactions with the projection, as indicated by block 328 and process those user interactions, as indicated by block 330. For instance, the user interactions may be to filter the projection in some way, or to otherwise process the information generated on the projection.

Figure 6:
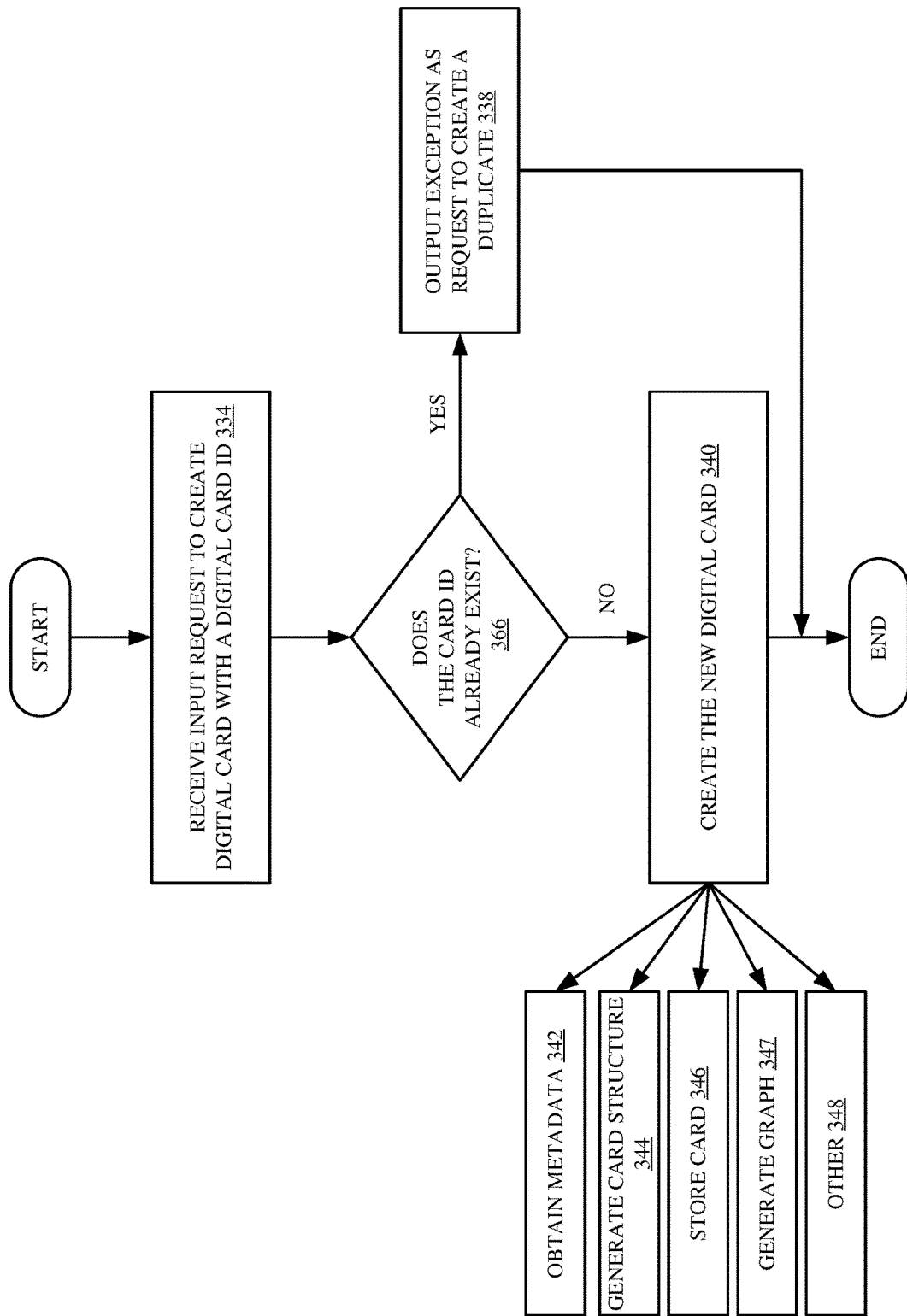
FIG. 6 is a flow diagram illustrating one example of creating a digital card.

FIG. 6 is a flow diagram illustrating one example of the operation of digital card creation/deletion/modification component 146 in creating a digital card. Component 116 receives an input request to create a digital card. The request can include a digital card identifier (ID) or the digital card ID can be created by component 146 after receiving the request. Receiving the request is indicated by block 334 in the flow diagram of FIG. 6. The request can be received directly from one of the user computing systems 106-108 or the request can be received through metafolder system 110 or in other ways. Component 146 can access the graphs 126 in data store 124 or another data store to determine whether the digital card ID already exists, at block 336. If so, component 146 can trigger the generation of an exception indicating that the request is requesting the system to create a duplicate digital card, as indicated by block 338. Assuming, at block 336, that the digital card ID does not already exist, then component 146 creates the new digital card, as indicated by block 340.

In one example, if the metadata used in generating the digital card is not provided along with the request, then component 146 can obtain the metadata (representing the underlying digital object that is represented by the digital card) from content aggregation system 114 or from another source, as indicated by block 342. Component 146 then generates the card structure (such as that shown in FIG. 2) and populates the card structure with the obtained metadata, as indicated by block 344. Component 146 can then provide the information to one or more data storage systems 116-118 and allow those systems to store the digital card, as indicated by block 346. The new card can be created in other ways or with other information, as indicated by block 348.

An indication that the new card has been created can be provided from component 146 to graph management system 130 so that a graph 126 can be generated for the new digital card.

Figure 7:
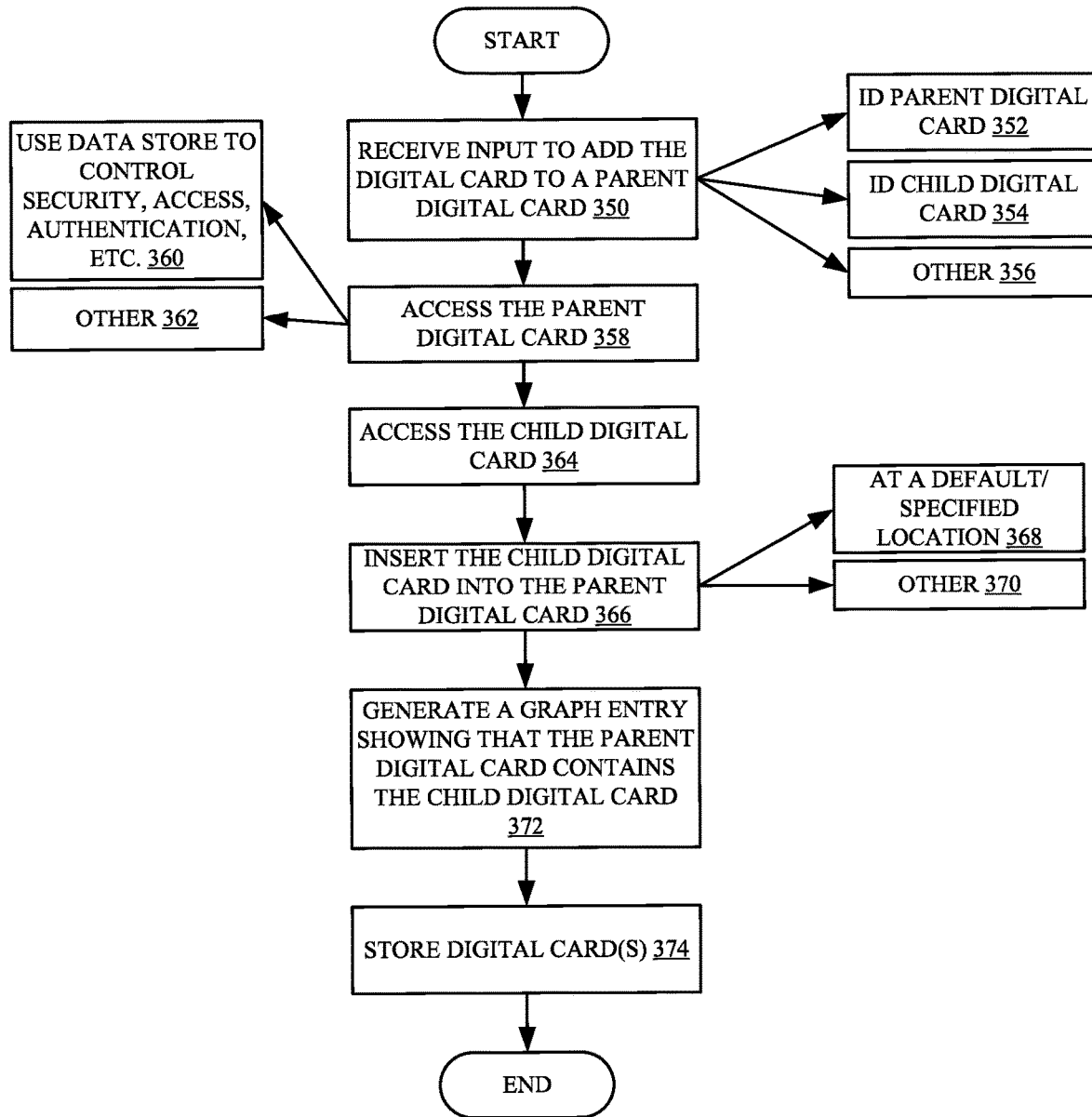
FIG. 7 is a flow diagram illustrating one example of creating a relationship between two digital cards.

FIG. 7 is a flow diagram illustrating one example of the operation of relationship management component 156 in adding a digital card into another digital card. Relationship management component 156 receives an input indicating that a user wishes to add a first digital card to a second digital card so that the first digital card is in a child relationship relative to the second digital card which is in a parent relationship to the first digital card. In another example, the first digital card can be referred to as "containing" the second digital card. Receiving an input to add a child digital card to a parent digital card is indicated by block 350 in the flow diagram of FIG. 7. The input to add a child card to a parent card may include the parent digital card ID as indicated by block 352 and the child digital card ID is indicated by block 354. The request or input may include a wide variety of other information 356 as well.

Relationship management component 156 then accesses the parent digital card, as indicated by block 358. Again, component 156 uses the data storage system 116-118 where the parent digital card is stored to perform the security, authentication, access control processing to determine whether the user requesting access to the digital card is permitted to have access. Using the data storage system 116-118 to control these functions is indicated by block 360 in the flow diagram of FIG. 7. Accessing the parent digital card can be done in other ways as well, as indicated by block 362.

Relationship management component 156 then accesses the child digital card as indicated by block 364. Again, the underlying data storage system can be used to manage whether the desired access is permissible.

Relationship management component 156 then modifies the parent digital card to insert a reference to the child digital card in the parent digital card. In one example, this may be done by modifying the parent digital card to include a "contains" relationship to a reference of the child digital card such as by inserting a relationship indicator 194 in the parent digital card. Inserting the child digital card into the parent digital card is indicated by block 366 in the flow diagram of FIG. 7. Thus, the child digital card, itself, may not be inserted into the parent digital card, but a reference (relationship indicator 194) to the child digital card is inserted into the parent digital card along with a property indicating that the parent digital card is in a "contains" relationship to the child digital card. Relationship management component 156 can insert the reference to the child digital card at a position within the parent digital card (such as above or below other references to child digital cards in that same parent digital card) either at a default location in the parent digital card, or at a specified location which may be specified in the request to insert the child digital card, or that may be specified in other ways. Inserting the reference to the child digital card at a default or specified location within the parent digital card is indicated by block 368 in the flow diagram of FIG. 7. The child digital card may be inserted into the parent digital card in other ways as well, as indicated by block 370.

The information indicating when and where the child digital card was inserted into the parent digital card can be provided to relationship graph component 138 which generates a graph entry in the graphs 126 for the parent and/or child digital cards. Generating the graph entries is indicated by block 372 in the flow diagram of FIG. 7. The parent and child digital cards can then be stored in the respective data storage systems 116-118, as indicated by block 374.

Figure 8:
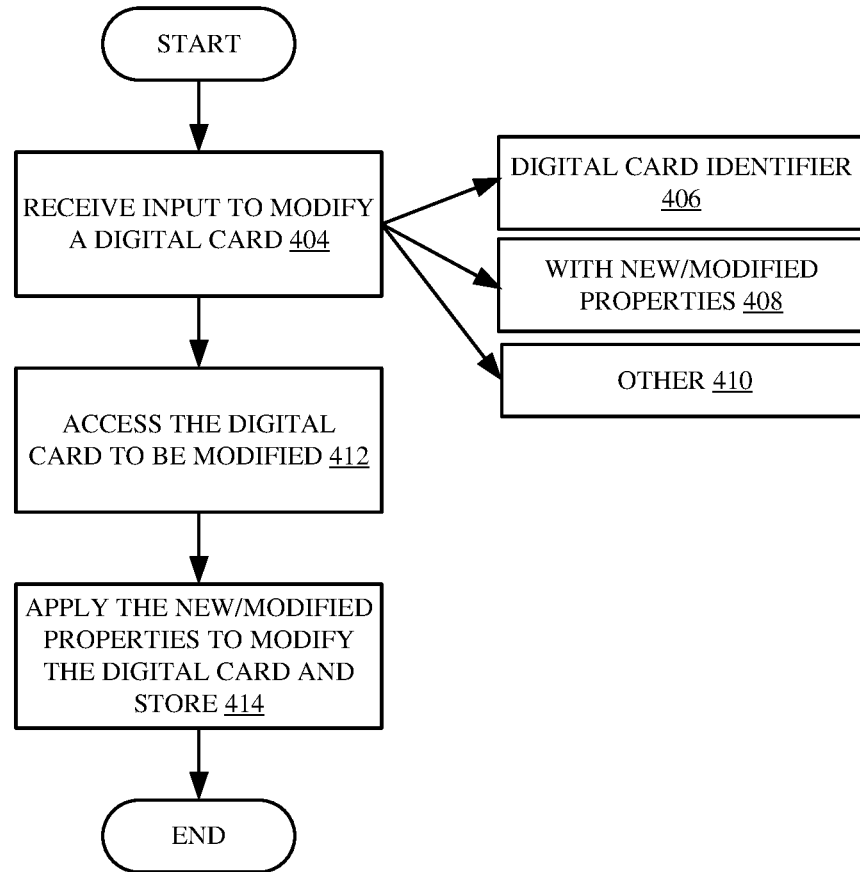
FIG. 8 is a flow diagram illustrating one example of modifying a digital card.

FIG. 8 is a flow diagram showing one example of the operation of digital card creation/deletion/modification component 146 in modifying the content of a digital card. Component 146 first receives an input to modify a digital card. Receiving the input is indicated by block 404 in the flow diagram of FIG. 8. The request may identify the digital card to be modified, as indicated by block 406. The request may also include the new or modified properties of the identified digital card, as indicated by block 408. The request can be received through metafolder system 110 or directly from a user computing system 106-108 and the request may include other items as well, as indicated by block 410.

Component 146 then accesses the digital card to be modified. Component 146 can provide a request for the digital card, along with the identity of the user requesting the digital card, and the requested modification, and/or other information to the data storage system 116-118 where the pod containing the digital card is stored. The data storage system 116-118, itself, handles the security, authentication, and access control. Accessing the digital card to be modified is indicated by block 412 in the flow diagram of FIG. 8. The new or modified properties are applied to the digital card and the digital card is then stored. The push/synchronization system 160 can push the modified properties to locations where the digital card is represented. Applying the new or modified properties to the digital card is indicated by block 414 in the flow diagram of FIG. 8.

Figure 9:
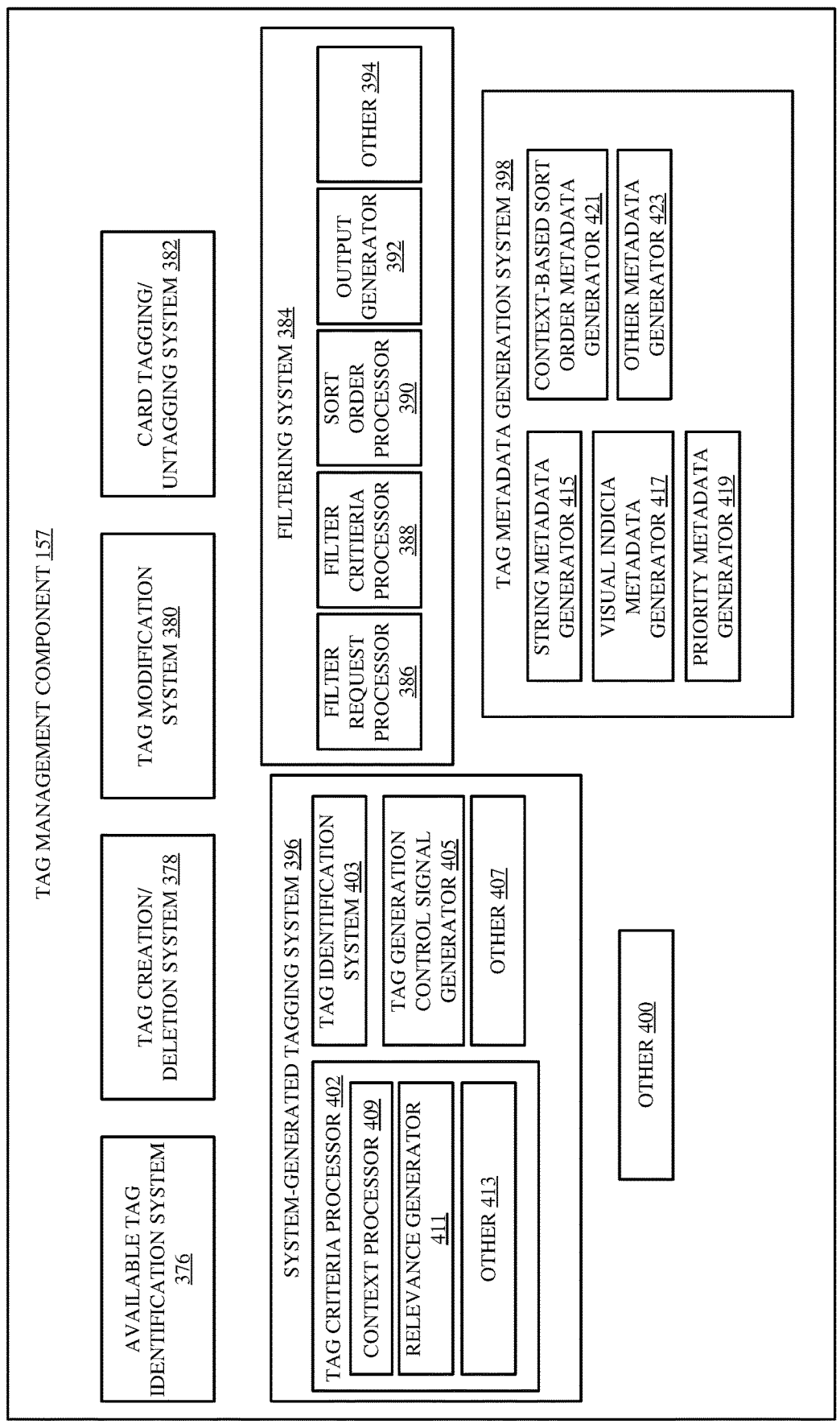
FIG. 9 is a block diagram showing one example of a tag management component.

FIG. 9 is a block diagram showing one example of tag management component 157 in more detail. Tag management component 157 includes available tag identification system 376, tag creation/deletion system 378, tag modification system 380, card tagging/untagging system 382, filter system 384 (which, itself, includes filter request processor 386, filter criteria processor 388, sort order processor 390, output generator 392 and other items 394), system-generated tagging system 396, tag metadata generation system 398, and other items 400. System-generated tagging system 396 includes tag criteria processor 402, tag identification system 403, tag generation control signal generator 405, and other items 407. Tag criteria processor 402 includes context processor 409, relevance generator 411, and other items 413. In the example shown in FIG. 9, tag metadata generation system 398 includes string metadata generator 415, visual indicia metadata generator 417, priority metadata generator 419, context-based sort order metadata generator 421, and other metadata generator 423.

Before describing the overall operation of tag management component 157 in more detail, a description of some of the items in tag management system 157, and their operation, will first be provided. Available tag identification system 376 may receive an input from a user or application or from an automated system requesting to know of all of the available tags that have already been created. System 376 can then execute a query against tag container 217 to identify the various tags that are contained in tag container 217. An indication of the tags may be returned as an enumeration of the tags, or as another listing or other identifier identifying the available tags.

Tag creation/deletion system 378 can process inputs to create additional tags in tag container 217 and to delete tags from tag container 217. Tag modification system 380 processes requests to modify existing tags, and card tagging/untagging system 382 processes requests to tag a digital card with a specific tag, or to untag a digital card. Again, the inputs to modify a tag or to tag a digital card or untag a digital card can be generated manually, from an operator, or they can be automated or system-generated requests.

Filtering system 384 can receive a request to filter the digital cards based upon the tags that are applied to the digital cards and/or based on other metadata applied to the digital cards. Filter request processor 386 receives the request and identifies the filter criteria (e.g., the tags that are to be used to filter the digital cards or other filter criteria). Filter criteria processor 388 uses the filter criteria to identify digital cards that are to be returned in response to the request. Sort order processor 390 determines an order in which the filtered digital cards are to be returned and output generator 392 generates an output of the filtered digital cards in the sort order applied by sort order processor 390.

System-generated tagging system 396 can be used to automatically generate tags and to place tags on digital cards. In one example, system 396 evaluates tagging criteria to determine whether a tag is to be generated and/or applied to a particular digital card or a set of digital cards. Therefore, tag criteria processor 402 evaluates the tagging criteria to determine whether the tagging criteria are present. Context processor 409 can process context-dependent criteria. For instance, if a digital card is created in a certain context (such as using a browser), then certain tagging criteria may indicate that a tag should be applied to the digital card. However, if the digital card is generated in a different context (such as from an email system or another application), then context processor 409 may determine that the context criteria do not indicate that a tag should be generated.

As one example, context processor 409 may also determine that digital cards created in certain contexts are to have tags applied to them identifying that context. For instance, assume that a digital card is created for each digital item (e.g., URL) that is bookmarked by a user in the user's browser. It may be that context processor 409 determines that every digital card generated for an item that is bookmarked should be tagged with a "bookmarked" tag. This is just one example of automatically generating a tag based on context. The criteria for automatically generating a tag based on context may vary with the different contexts that are used by the user.

In one example, tags are also automatically generated based upon the content of the digital cards. For instance, if the digital cards are deemed to be related to one another in terms of content, then a tag may be automatically generated for those digital cards, indicating that they are related to one another. In one example, relevance generator 411 processes the content of the digital cards to determine the relevancy of one digital card with respect to other digital cards or groups of digital cards. The degree of relevance may be measured in terms of similarity or in other ways. The degree of relevance may be expressed as a metric value, or as a threshold indicator indicating whether the relevance meets a threshold value or in another way. If the two cards are deemed to be sufficiently relevant to one another (e.g., similar to one another), or dealing with similar content, then relevance generator 411 may determine that the tagging criteria have been met so that a tag is automatically generated for one or more of the digital cards to indicate that the digital cards are related to one another.

Once tag criteria processor 402 determines that a tag is to be automatically generated, then tag identification system 403 identifies which particular tag in tag container 217 (or in a different location) should be applied to the digital card. Tag generation control signal generator 405 can generate a control signal to either generate a new tag and apply that tag to the digital card or set of digital cards, or to apply an existing tag identified using tag identification system 403 to the set of digital cards.

Tag metadata generation system 398 can be used to add metadata to a tag when the tag is generated or modified. String metadata generator 415 allows the tag to be identified using a string which may be input by the user or by an automated system. Visual indicia metadata generator 417 may be used to apply metadata that gives the tag particular visual indicia, when it is displayed, that distinguish the tag from other tags, regardless of the string metadata. For instance, the visual indicia may be set to indicate a tag color, a blinking pattern of the tag, a size of the tag, a symbol for the tag, a font or other visual indicia. Priority metadata generator 419 can be used to generate priority metadata indicating the priority of digital cards tagged with a particular tag relative to the priority of untagged digital cards or other digital cards tagged with other tags. For instance, if a tag is generated with "pin" metadata, this may indicate that all digital cards tagged with that tag should be prioritized in the display of digital cards returned in response to a query over other digital cards. The priority metadata may be an alphanumeric indicator of priority, or another indicator of priority. Context-based sort order metadata generator 421 can be used to indicate a sort order based upon the context of a calling application. For instance, if a first application in a first context calls for digital cards having a plurality of different tags, then those digital cards may be sorted when they are returned to the calling application according to a first sort order, based upon the tags applied to the digital cards. If a second application in a second context requests the same set of digital cards, then the sort order applied to the digital cards as the first application may be different, but still based upon the tags, than the sort order when the digital cards are returned to the first application in the first context. By way of example, if one set of digital cards are tagged with a "meeting" tag, while another set of digital cards are tagged with a "document" tag, then when a meeting application requests digital cards with both of the digital tags, the tags may be sorted with the digital cards tagged with the "meeting" tag higher than those with the "document" tag. However, if the calling application is a word processing application, then the digital cards with the "document" tag may be sorted higher than the digital cards with the "meeting" tag. This is just one example of context-based sorting.

Figure 10:
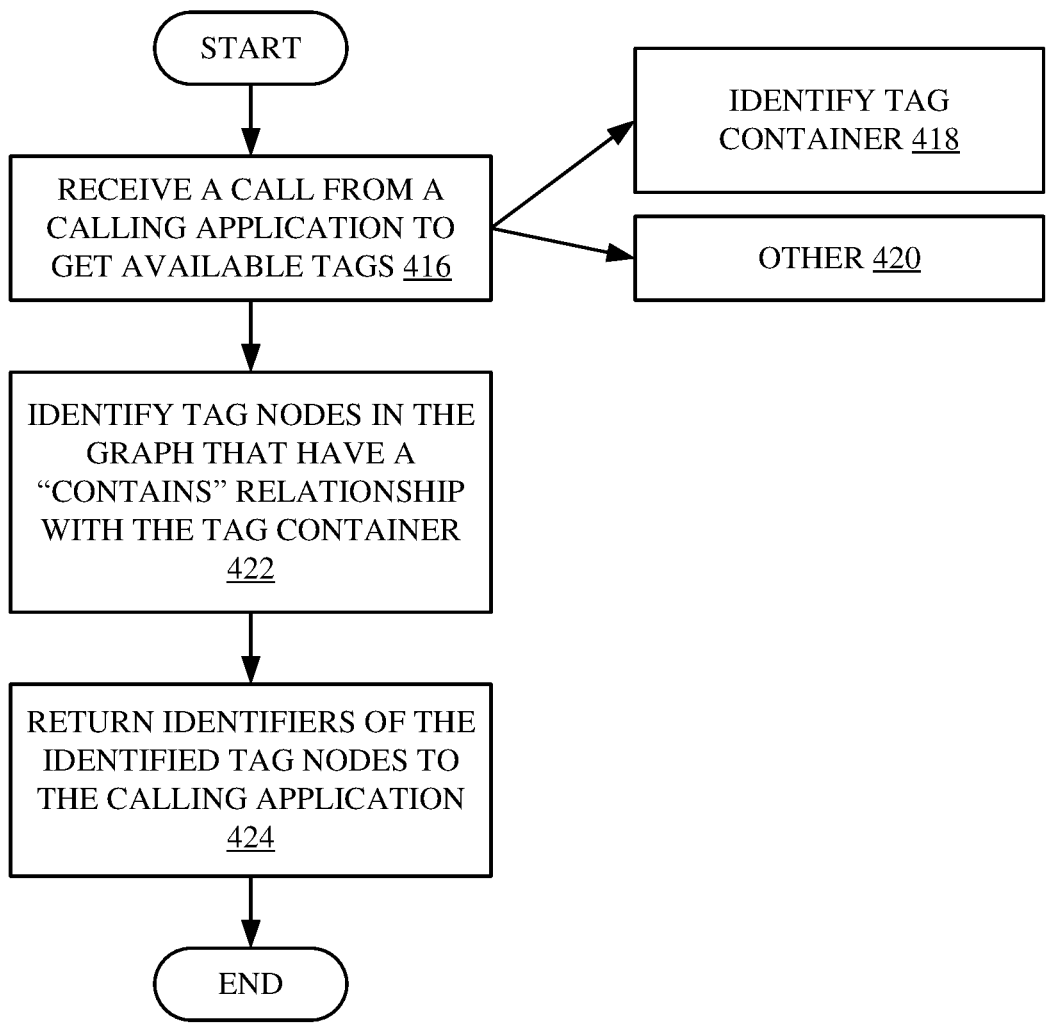
FIG. 10 is a flow diagram showing one example of querying tags.

FIGS. 10-16 are flow diagrams illustrating different operations that may be performed using tag management component 157. FIG. 10 is a flow diagram illustrating the operation of available tag identification system 376 in serving a call from a calling application which is requesting a response showing all available tags in tag container 217. Available tag identification system 376 first receives a call from a calling application seeking the available tags, as indicated by block 416. The call may identify the tag container 217 which is to be queried, as indicated by block 418. The call may include other items 420 as well.

Available tag identification system 376 then identifies tag nodes in the graph 126 that have a "contained" relationship with the tag container 217, as indicated by block 422. Referring again, for example, to FIG. 4, available tag identification system 376 would identify tag 221 and tag 219 has having the "contains" relationship with tag container 217. Available tag identification system 376 can then return the identifiers identifying the tag nodes to the calling application, as indicated by block 424. For instance, the identifiers can include the string metadata, or any of the other metadata assigned to the particular tags represented by nodes 221 and 219.

Figure 11:
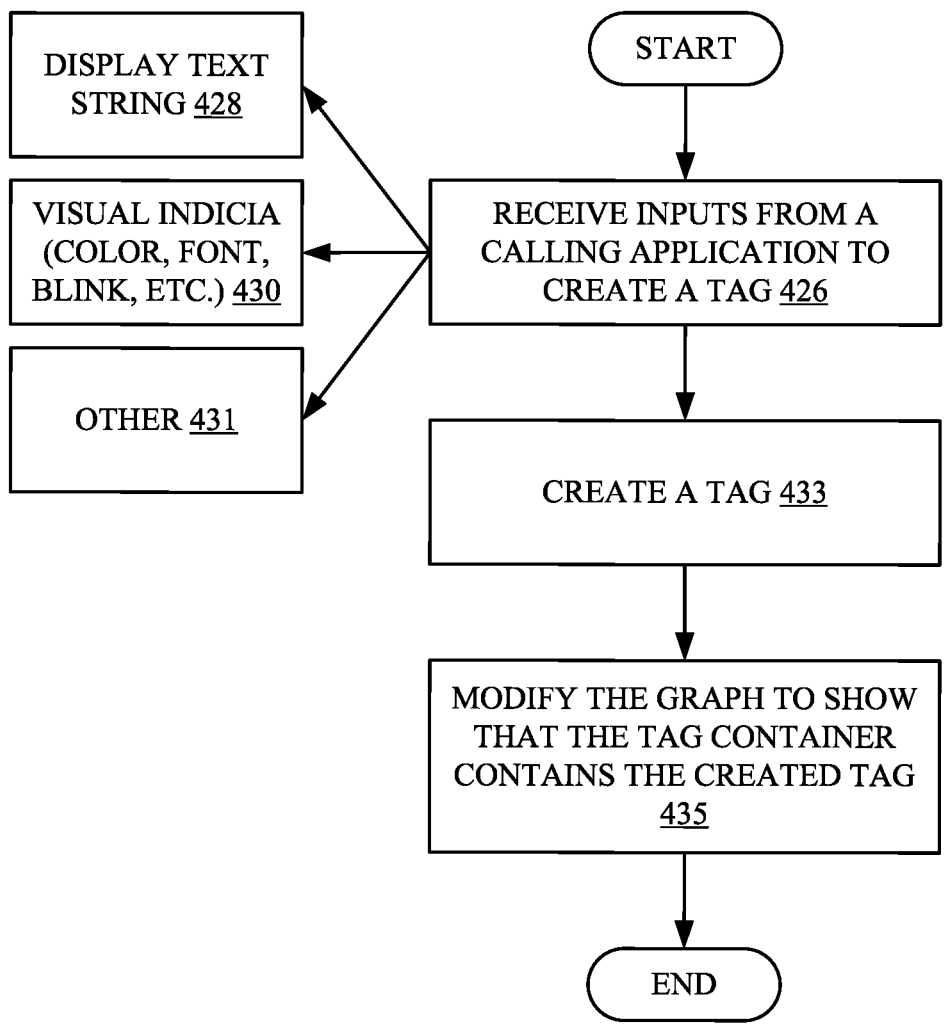
FIG. 11 is a flow diagram showing one example of creating a tag.

FIG. 11 is a flow diagram illustrating one example of the operation of tag creation/deletion system 378 in creating a new tag. Tag creation/deletion system 378 first receives an input from a calling application (based on a manual request or an automated request) to create a tag, as indicated by block 426. The input may include a display text string 428 that is to be used to identify the tag, the visual indicia metadata 430, or other information 431 that can be used to create the tag. Tag creation/deletion system 378 then creates a tag, as indicated by block 433 and generates an output to graph management system 130 to modify the graph 126 to show that the tag container 217 contains the newly created tag, as indicated by block 435. System 378 can also use push/synchronization system 140 to notify interested parties (e.g., applications) that the tag has been created.

Figure 12:
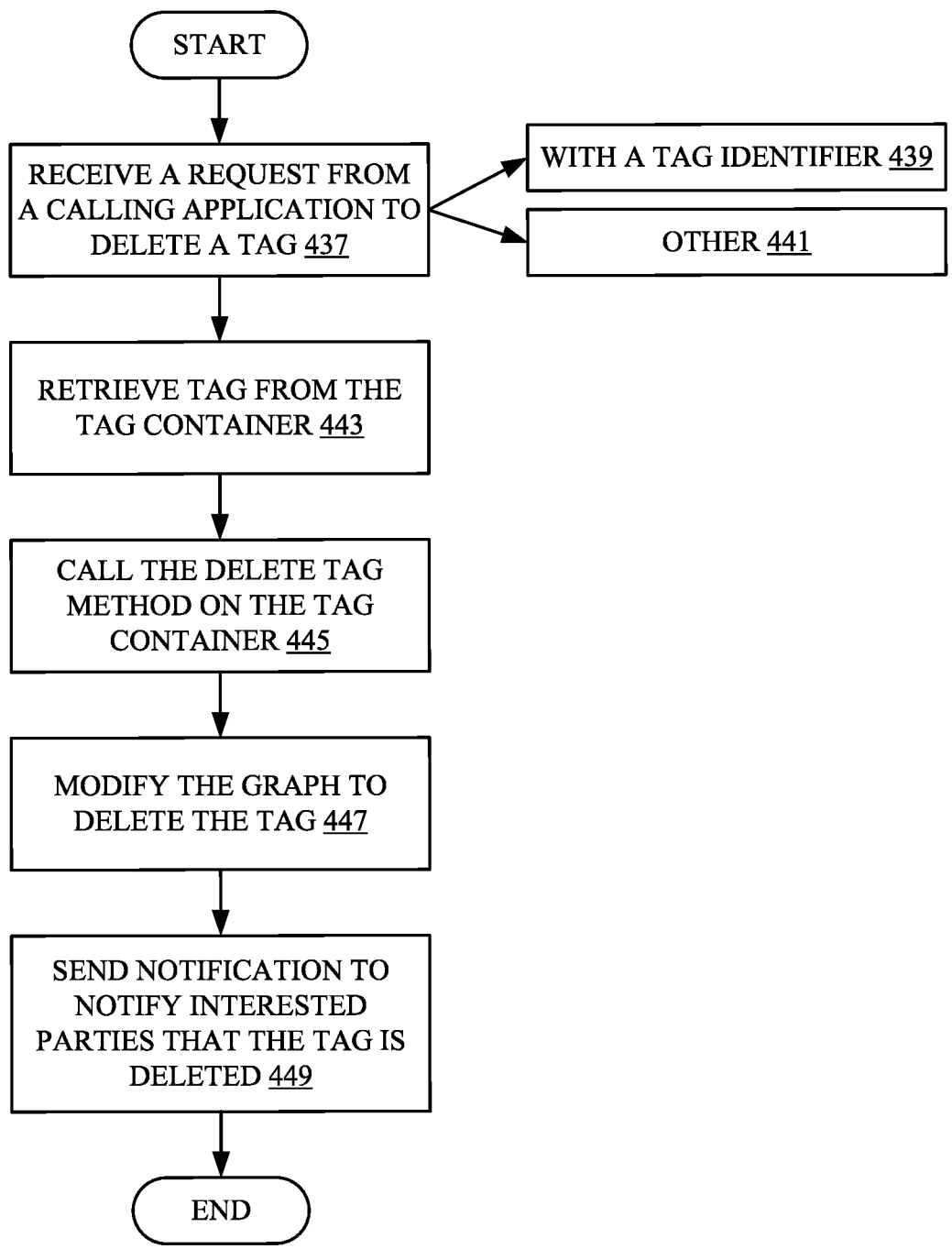
FIG. 12 is a flow diagram showing one example of deleting a tag.

FIG. 12 is a flow diagram illustrating one example of the operation of tag creation/deletion system 378 in deleting a tag from tag container 217. System 378 receives a request from a calling application (an automated request or a manual request) to delete a tag, as indicated by block 437 in the flow diagram of FIG. 12. The request may include a tag identifier 439 identifying the tag and other information 441. Tag creation/deletion system 378 then identifies and retrieves the tag from the tag container 217 as indicated by block 443. This can be done by calling a "delete tag" method on container 217 or in other ways, as indicated by block 445. Tag creation/deletion system 378 then sends an output to graph management system 130 which modifies the graph 126 to delete the tag node from the graph, as indicated by block 447. Tag creation/deletion system 378 can then use push/synchronization system 140 to send notifications to notify other interested parties (applications, etc.) that the tag has been deleted, as indicated by block 449.

Figure 13:
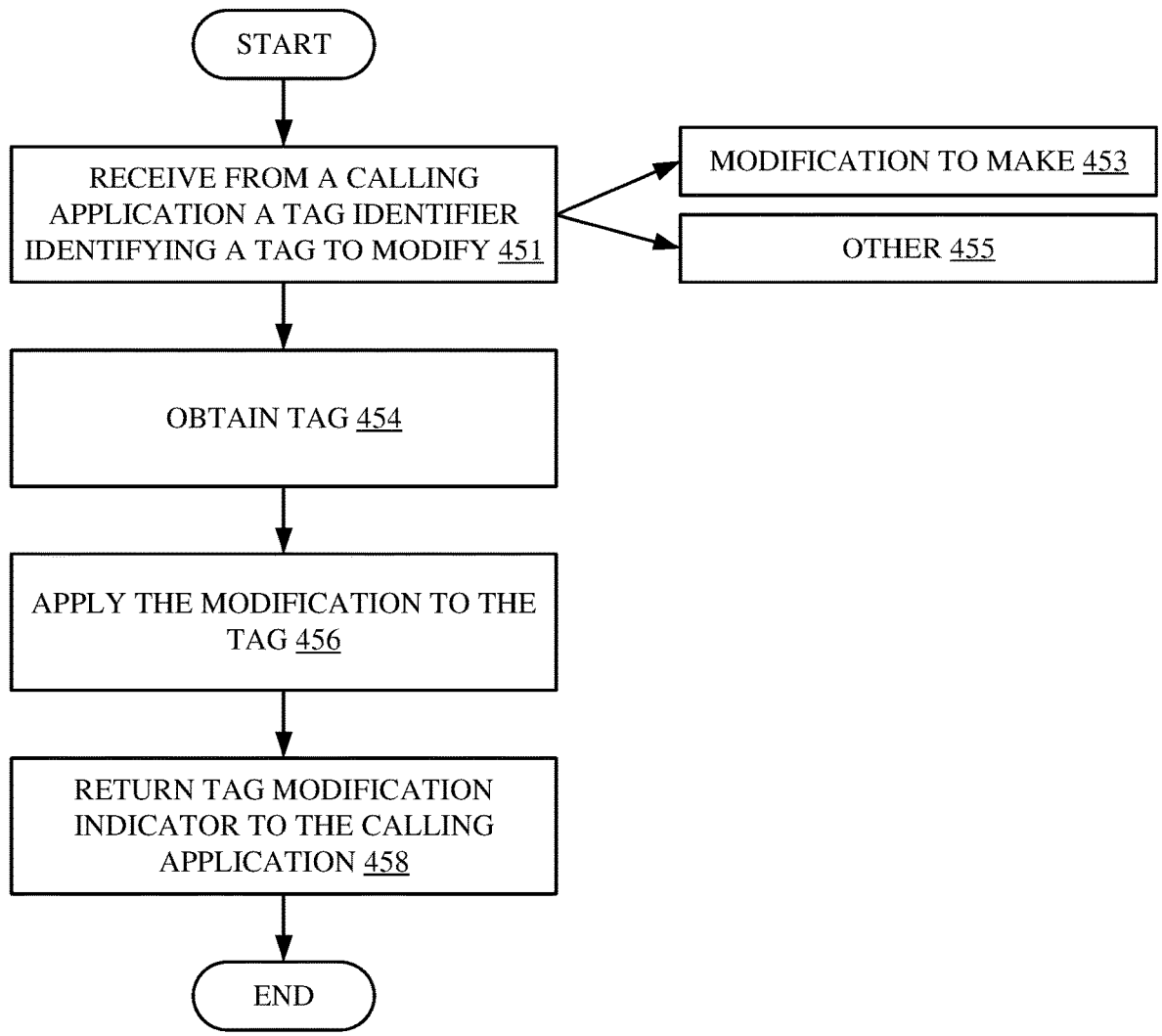
FIG. 13 is a flow diagram showing one example of modifying a tag.

FIG. 13 is a flow diagram illustrating one example of the operation of tag modification system 380 in modifying an existing tag. Tag modification system 380 receives a tag identifier identifying a tag to modify, from a calling application, as indicated by block 451. The request can also identify the modification to make, as indicated by block 453, and other information as indicated by block 455. Tag modification system 380 then obtains access to the tag in tag container 217, as indicated by block 454. Tag modification system 380 applies the modification to the tag, as indicated by block 456 and returns a tag modification indicator to the calling application, indicating that the tag has been modified in tag container 217, as indicated by block 458. By way of example, the tag can be modified by changing the string associated with the tag, the visual indicia, the priority indicator, or other metadata corresponding to the tag. A notification can also be sent to other applications or data stores indicating that the tag has been modified.

Figure 14:
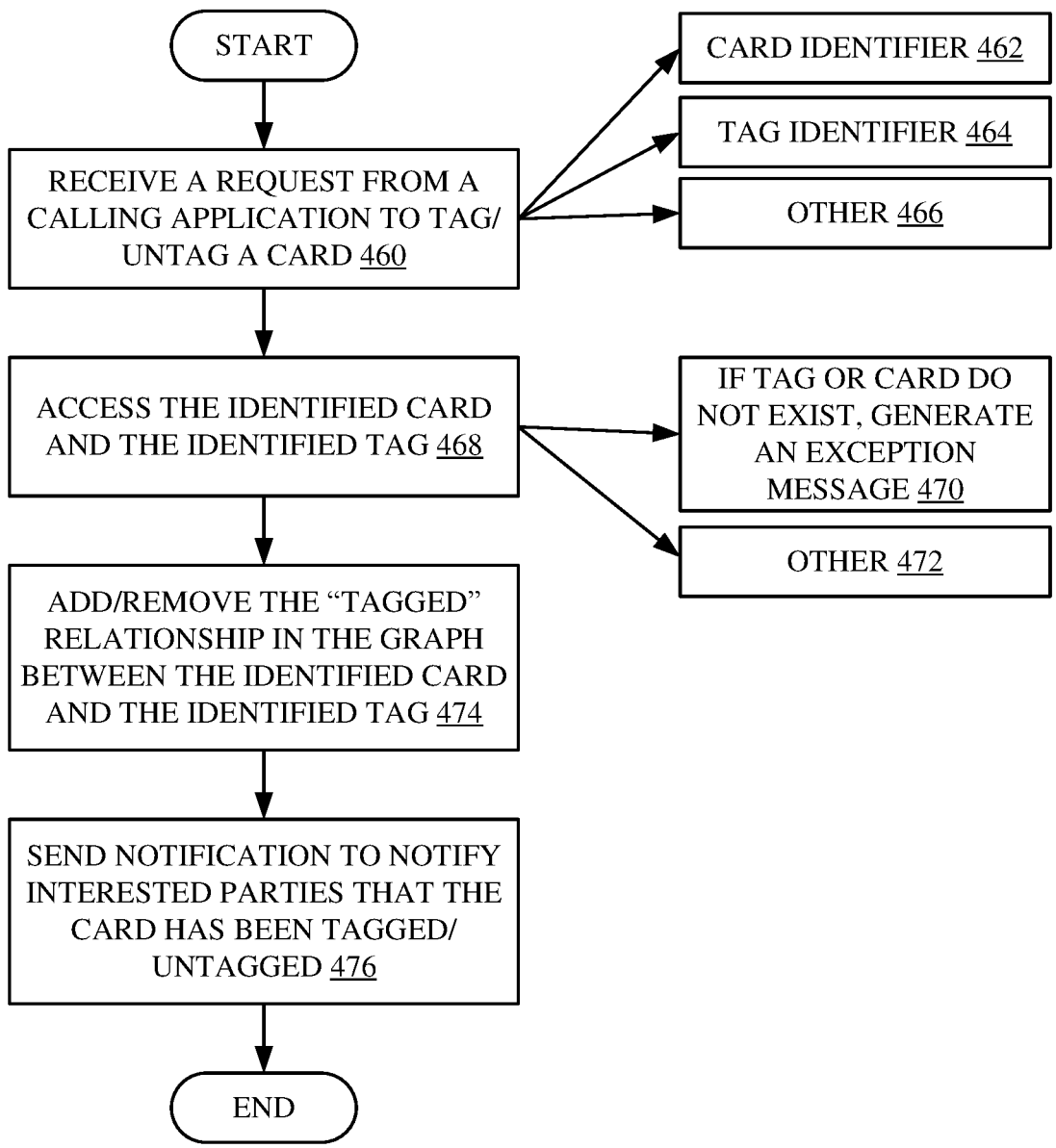
FIG. 14 is a flow diagram showing one example of tagging or untagging a digital card.

FIG. 14 is a flow diagram illustrating one example of the operation of card tagging/untagging system 382 in applying a tag to a digital card and in removing a tag from a digital card. Card tagging/untagging system 382 receives a request from a calling application to tag or untag a digital card. Receiving the request is indicated by block 460 in the flow diagram of FIG. 14. The request can include a card identifier 462 identifying the digital card to be tagged and the tag identifier 464 identifying the particular tag that is to be applied to (or removed from) the identified digital card. The request can include other items 466 as well. Tag modification system 380 accesses the identified digital card to be tagged or untagged and the identified tag, as indicated by block 468. If either the tag identified in the request or the digital card identified in the request do not exist, then card tagging/untagging system 382 can throw an exception or otherwise generate a message indicating an error, as indicated by block 470. The identified digital card and tag can be accessed in other ways as well, as indicated by block 472. Card tagging/untagging system 382 can then generate an output to graph management system 130 indicating that the "tagged" relationship should be added between the node corresponding to the identified digital card in the graph and the node representing the tag, when the operation is to apply a tag, and that the "tagged" relationship should be removed from the node for the identified digital card when the request is to untag the card. Adding or removing the "tagged" relationship between nodes representing the identified digital card and the identified tag is indicated by block 474 in the flow diagram of FIG. 14. Push/synchronization system 160 can then send a notification to notify interested parties (applications/datastores, etc.) that the card has been tagged or untagged, as indicated by block 476.

Figure 15:
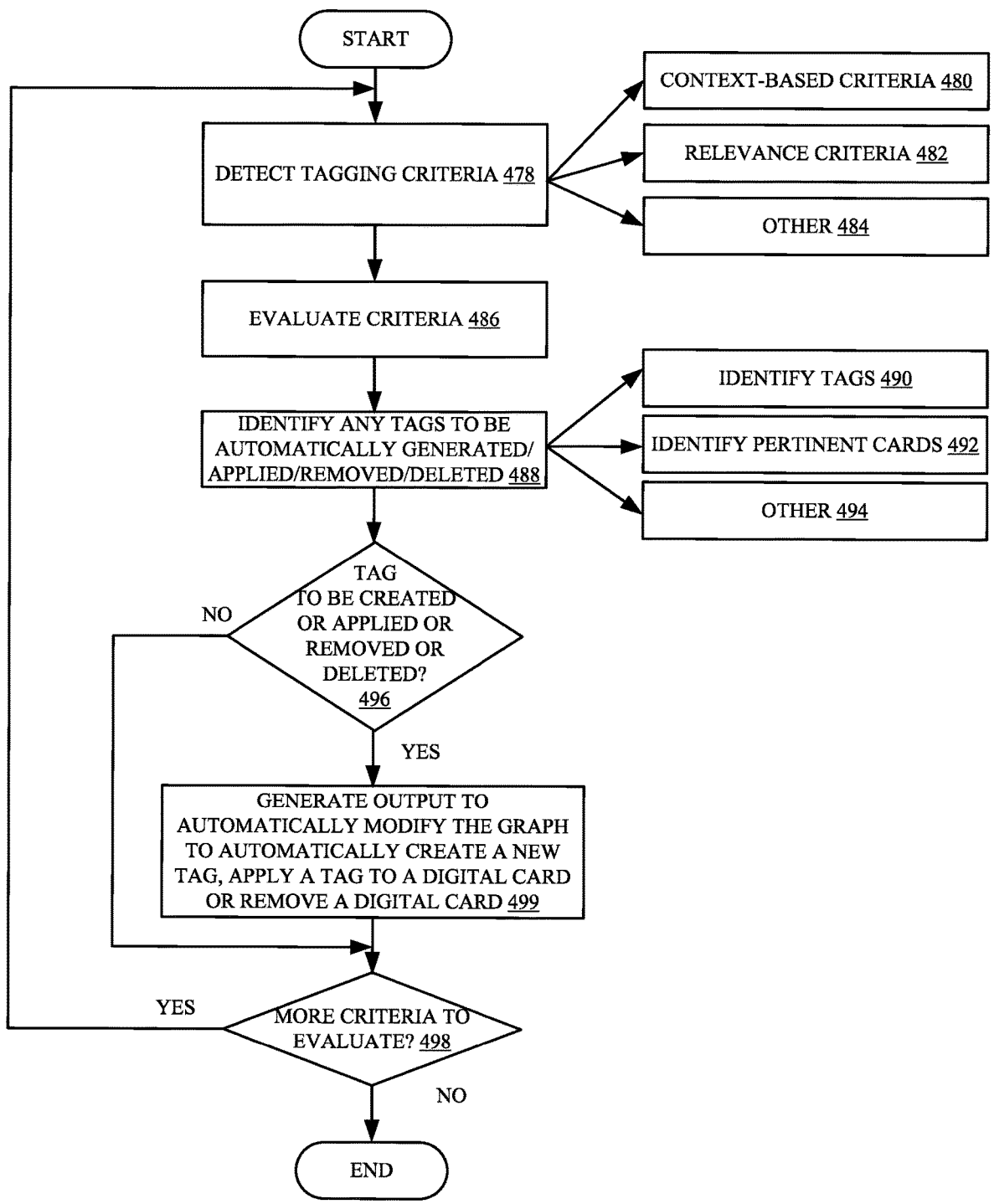
FIG. 15 is a flow diagram showing one example of automatically generating a tag.

FIG. 15 is a flow diagram illustrating one example of the operation of system-generated tagging system 396 in automatically performing tagging operations. In one example, tag criteria processor 402 continuously or intermittently monitors tagging criteria to determine whether tags should be created or generated and applied to digital cards or whether tags should be deleted or removed from digital cards. Detecting the tagging criteria is indicated by block 478 in the flow diagram of FIG. 15. As discussed above, the criteria can be context-based criteria 480, relevance criteria 482, or other criteria 484. The detected criteria may be evaluated in a number of different ways. For instance, the detected criteria can be used as input to a classifier, a deep learning system, a rules-based model, or another type of system that determines whether the criteria have been met in order to generate or apply a tag, or to delete a tag or remove a tag from a digital card. As one example, a rule may be written indicating that every time a user bookmarks a uniform resource locator (URL) in a browser, that a digital card is created corresponding to the bookmarked URL, and a "bookmark" tag is applied to that digital card. In another example, two digital cards may be evaluated against one another with respect to their content to determine how similar or related they are, or how relevant the content of one tag is with respect to the content of another tag. Evaluating the criteria is indicated by block 486 in the flow diagram of FIG. 15.

Tag criteria processor 402 processes the tag criteria to determine whether action is to be taken, (e.g., whether a tag should be created and applied or deleted or removed from a digital card). If action is to be taken, then tag identification system 403 identifies any tags that are to be automatically generated, applied to a digital card, and/or deleted or removed from a digital card, as indicated by block 488. Tag identification system 403 may identify the one or more tags in tag container 217 that are to be applied to a digital card, as indicated by block 490. Tag identification system 403 can also identify any pertinent digital cards (the cards where the tag is to be added or removed), as indicated by block 492. The tags and digital cards can be identified in other ways as well, as indicated by block 494.

If, at block 496, there are no tags that are to be created, applied, removed, or deleted, then processing continues at block 498 where tag criteria processor 402 determines whether there are any other tagging criteria to be evaluated. If so, processing reverts back to block 478 where the tagging criteria are detected and evaluated. If, at block 496, a tag is to be created or applied, or deleted or removed, then tag generation control signal generator 405 generates control signals to control tag creation/deletion system 378 (where a tag is to be created, for instance), or to control card tagging/untagging system 382 (where a digital card is to be tagged or untagged). The control signals are generated and an output is provided to graph management system 130 to automatically modify the graph 126 in order to automatically generate a tag, apply the tag to a digital card, delete the tag, or remove the tag from a digital card, as indicated by block 499.

Figure 16:
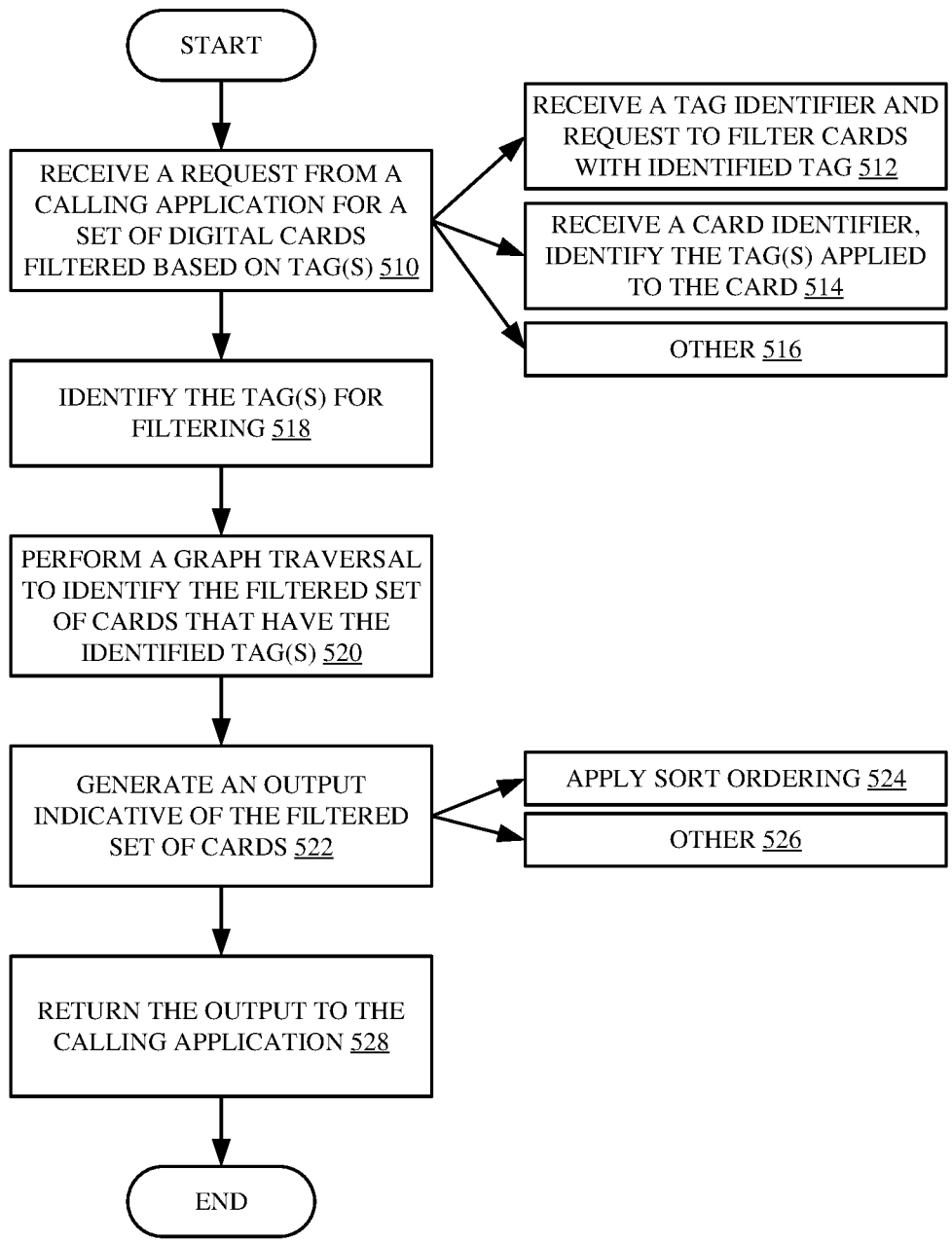
FIG. 16 is a flow diagram showing one example of filtering digital cards based on tags.

FIG. 16 is a flow diagram illustrating one example of the operation of filtering system 384 in receiving a request for filtered digital cards (filtered based on metadata, such as applied tags) from a calling application, and returning a responsive filtered set of digital cards. Filter request processor 386 receives a request from a calling application for a set of digital cards filtered based upon the tags that are applied to those cards, as indicated by block 510 in the flow diagram of FIG. 16. The request may include a tag identifier that identifies a tag, and a request to filter the digital cards to identify the digital cards with the identified tag. Receiving a tag identifier and a request to filter cards based on the tag is indicated by block 512 in the flow diagram of FIG. 16. In another example, the request can identify a digital card along with a request to identify the tags applied to that digital card, and then to filter the set of digital cards based upon the tags that are applied to the identified digital card. This is indicated by block 514 in the flow diagram of FIG. 16. The request can take other forms as well, as indicated by block 516. Filter request processor 386 then identifies the tags that are to be used in the filtering operation, as indicated by block 518. For example, if the request for filtered data cards identifies a particular tag or set of tags that are to be used as the filter criteria, then those tags are identified by filter criteria processor 388. However, if the request identifies a digital card and the filter criteria are to be the set of tags applied to that card, then filter criteria processor 388 traverses the graph 126 from the identified digital card across all "tagged" relationships applied to that digital card to identify all tags that have been applied to that digital card. Those tags are then used for filtering.

Filter criteria processor 388 then performs a graph traversal traversing graph 126 to identify all digital cards that have the set of tags (the filtering criteria) applied to them, as indicated by block 520. For instance, once a tag is identified as a filter criterion, then filter criteria processor 388 can traverse graph 126 from that tag to all other digital cards that are in a "tagged" relationship with the tag. Those digital cards will be identified as the filtered output.

Output generator 392 then generates an output that identifies the filtered set of digital cards to the calling application. Generating the output is indicated by block 522 in the flow diagram of FIG. 16.

In one example, the tags may have sort metadata that identifies sort criteria used to sort the results according to a sort order. The sort criteria may be context-dependent sort criteria. In the case where sort criteria are provided (either sort criteria or context-dependent sort criteria) then sort order processor 390 sorts the filtered digital cards according to the sort criteria, as indicated by block 524 in the flow diagram of FIG. 16. Where the sort criteria are context-dependent, then sort order processor 390 obtains an indication of the calling application (to identify context) and uses the appropriate context-dependent sort criteria in sorting the digital cards. An indication of the sorted digital cards is then generated as the output. The output can be generated in other ways as well, as indicated by block 526. Output generator 392 then returns the output to the calling application, as indicated by block 528 in the flow diagram of FIG. 16.

Figure 17:
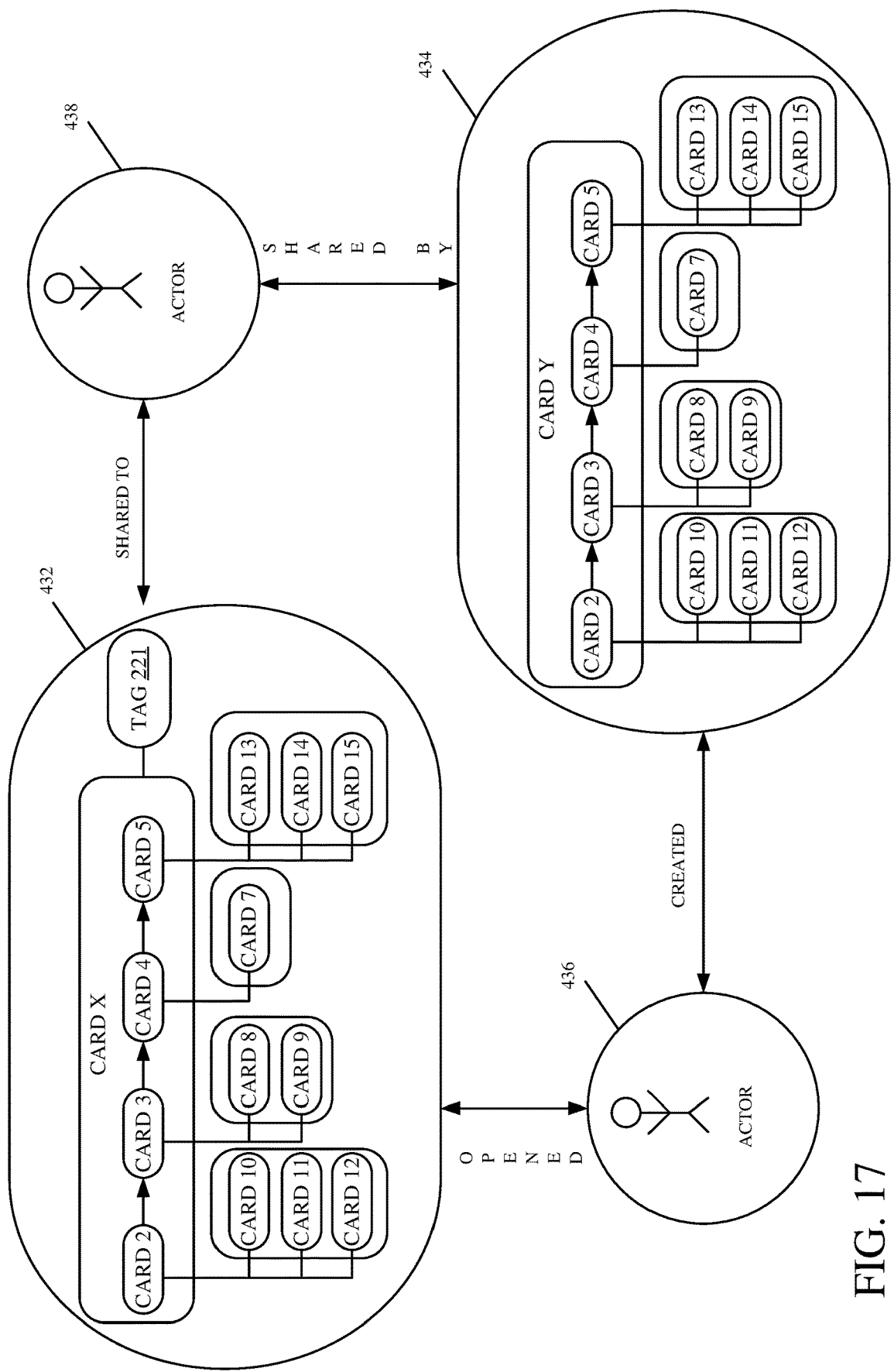
FIG. 17 is one example of how data is modeled with respect to users or actors.

FIG. 17 shows another example of a graph 126 which models a set (or collection) of data pods (or metafolders) 432 and 434. FIG. 17 shows that a single data pod may carry a plurality of different collections of digital cards which may or may not be interconnected. For instance, the graph illustrated in FIG. 17 shows a first collection (or metafolder) 432 and a second collection or metafolder 434. Because the graphs 126 are modeled around the user behavior, if a person performs an activity with respect to one of the sets of pods 432 or 434, the sets of pods may be connected through the actor, on the graph. FIG. 17, for instance, illustrates that a first user or actor 436 has opened collection (or metafolder) 432 and created collection (or metafolder) 434. The graph also shows that collection (or metafolder) 432 was shared to user or actor 438. Further, the graph shows that collection (or metafolder) 434 was shared by actor 438 as well.

Figure 18:
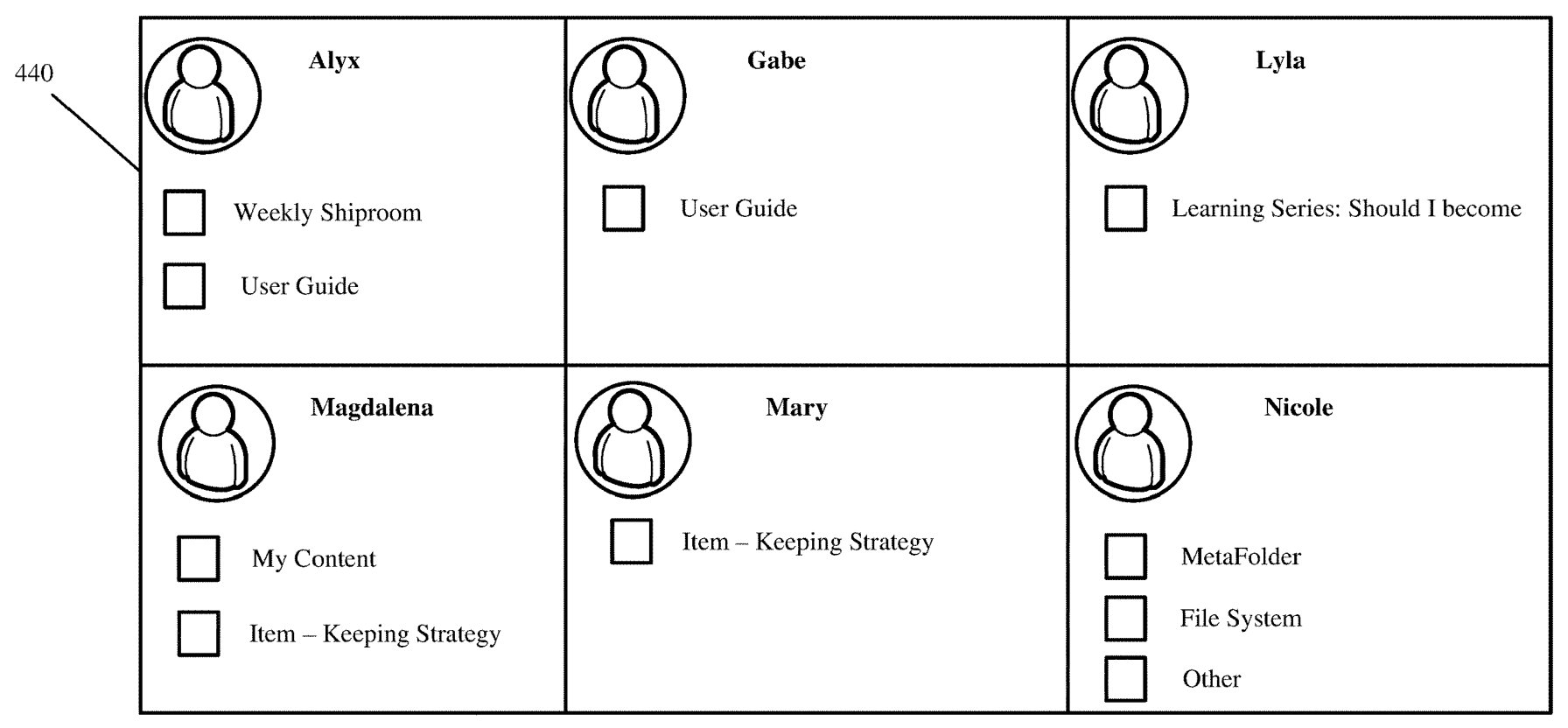

Projection generation system 132 can traverse graphs 126 or otherwise use graphs 126 and other information to generate views (or projections) of the data stored as digital cards in the decentralized data storage systems 115. In one example, as discussed above, views can be tailored queries for specific use cases. For example, FIG. 18 shows one example of a People view 440. People view 440 is generated by projection generation system 130 by traversing graphs 126 corresponding to a user (e.g., user 102) and grouping digital cards for a specific person, sorted by the persons name Projection 440 shows that a set of people (Alyx, Gabe, Magdalena, Lyla, Mary, and Nicole) are each related to a set of digital cards, which those individual people shared. In order to generate projection 440, projection generation system 132 traverses the graphs 126 from the activity or relationship "shared by". Projection generation system 132 queries all cards that have a "contains" relationship and determines whether each digital card has a corresponding "shared by" activity. If so, the cards are aggregated by person and each person's list of digital cards is sorted by time stamp. Then, the sets of digital cards are sorted based on the person's name, to provide an alphabetical list of people and the digital cards that each person shared.

Figure 19:
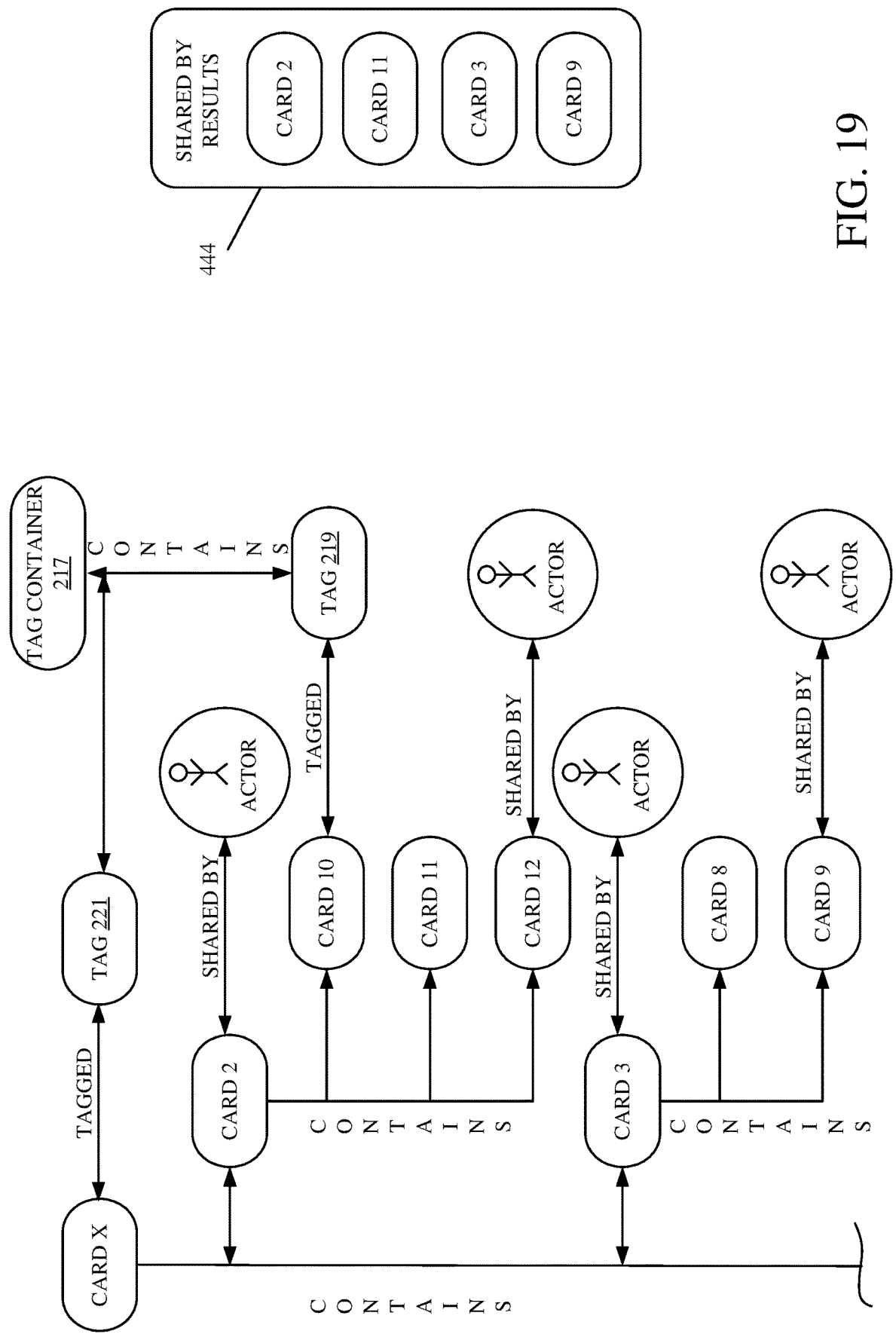
FIG. 19 is another example of how data is modeled with respect to activities and users.

FIG. 19 shows the graph structure discussed above with respect to FIG. 4, but actors are incorporated into the graph structure. Each of the actors shown in FIG. 19 is connected to a specific digital card by the "shared by" activity. FIG. 20 shows one example of a "Shared By" projection 442. In order to generate the Shared By projection 442, projection generation system 132 performs similar operations to those described above in order to generate the People view 440 shown in FIG. 18, except that there is no need to aggregate the search results by person. The sorting can be done by time stamp to show the latest shared digital cards first, instead of sorting on person name. Therefore, taking the example shown in FIG. 19, for instance, projection generation system 132 can traverse the graph shown in FIG. 19 to show that digital cards 2, 12, 3 and 9 all have "shared by" activities associated with them, and the graph links to the actor that shared those cards. Thus, the result set 444 will show all of the cards that have the "shared by" activity. In the example shown in FIG. 20, the Shared By display 442 includes a display element for each digital card that has the "shared by" activity. Each digital card is represented by a row of columns in the display 442. The first column in the row names the digital card. The second column indicates when the card was shared. The third column indicates the actor who shared the digital card, and the fourth column shows the most recent activity performed with respect to the digital card, regardless of the activity type. The resultant projection generated by projection generation system 132 is a flat list of digital cards ordered by time when they were shared, in descending order, as shown in FIG. 20. In one example, projection generation system 132 can recursively iterate through each digital card, to all its child digital cards. However, in one example, the number of levels deep in the recursive iteration may be limited to a certain number, in order to avoid recursively iterating through digital cards that have many children, grandchildren, etc.

FIG. 21 shows another example of a projection generated by projection generation system 132 as a "recently opened" projection 444. In an example in which data is modeled based on user behavior, if a user opens a digital object (such as a document) this may automatically trigger the user computing system to generate an event to metafolder system 110 in which activity graph component 136 generates an activity on graph 126 between the digital card representing the digital object opened by the user, and the user. In one example, projection generation system 132 generates the "Recently Opened" view 444 as a flat list of digital cards sorted by the "opened by" activity and the corresponding time stamp, in descending order. In the example shown in FIG. 21, each digital card also contains the event time (when it was opened) the owner (the identity of the user who created the digital card, if available), and a latest activity performed with respect to that digital card, regardless of activity type. Thus, each digital card is represented by a row in the "Recently Opened" display 444. The first column in each row shows the name of the digital card. The second column illustrates when the item was opened. The third column illustrates the owner of the item and the fourth column shows the most recent activity performed with respect to that digital card.

In one example, projection generation system 132 can also generate an "All" view such as view 446 shown in FIG. 22. The "All" view returns a hierarchal list of digital cards so that child cards are also depicted as being hierarchically located within their parent digital cards. The "All" view 446 shows a projection of digital cards based upon the latest activity performed with respect to the digital cards, regardless of the activity type. Thus, the digital cards are sorted based upon the most recent activity performed with respect to the card, regardless of activity type. The "All" view 446 shown in FIG. 22 includes the name of the digital card, the time when the digital card was modified, the owner of the digital card, and the last activity performed with respect to the digital card.

In another example, projection generation system 132 can generate a "Meeting" view such as view 448 shown in FIG. 23. Graph management system 130 can correlate the digital cards in the graphs 126 within a timeline. Time can be modeled as a single node or entity in the graph 126 to allow fast correlation among digital cards and time. Time can also be broken down into more specific pieces which allow range queries and time-based filtering of the digital cards. In the "Meeting" view example shown in FIG. 23, digital cards representing meetings are arranged in descending order of start time.

Figure 24:
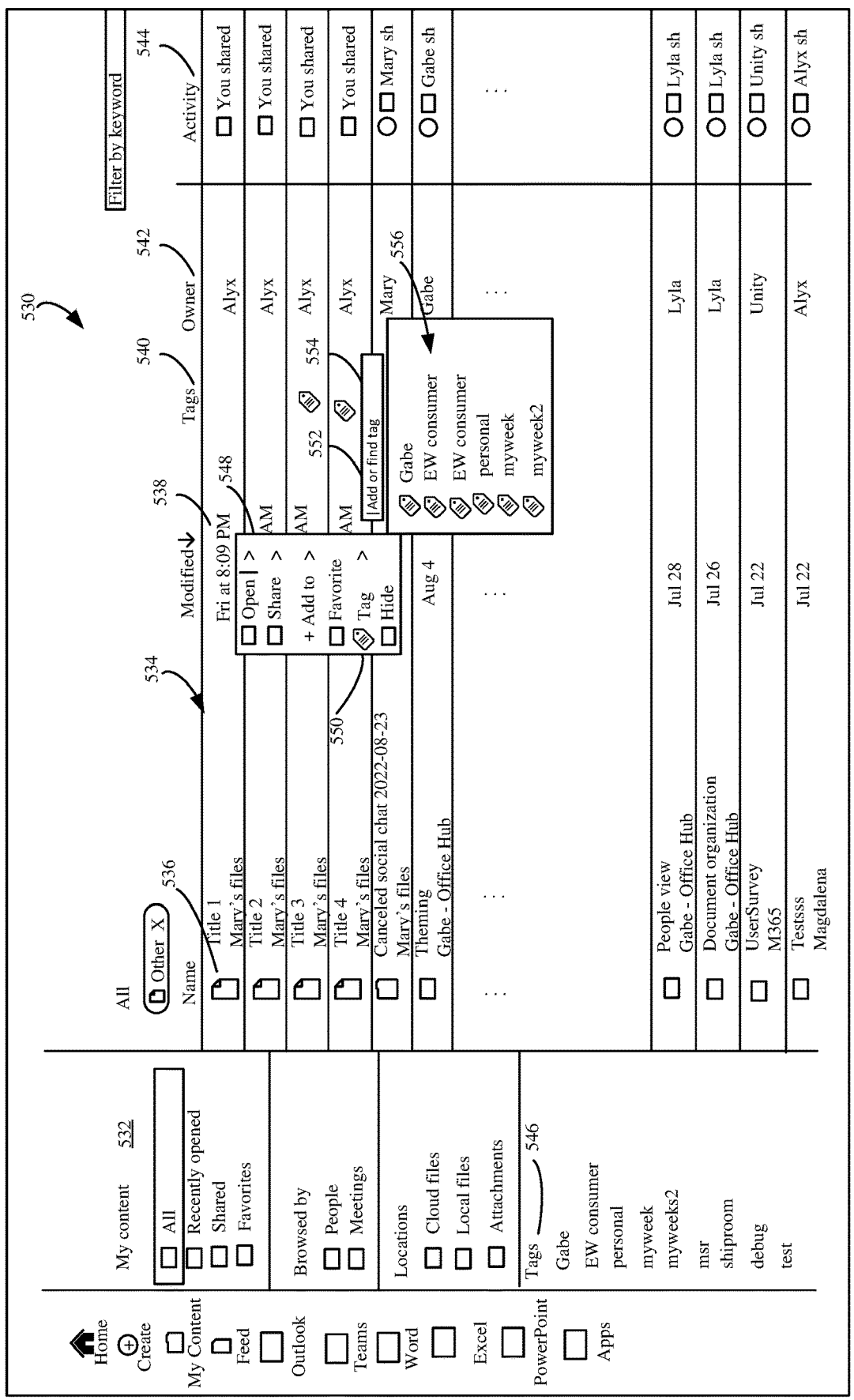
FIG. 24 is one example illustration of a projection illustrating tag functions.

FIG. 24 shows another projection 530 that can be generated by projection generation system 132. In the example shown in FIG. 24, projection 530 includes a content pane 532 that shows a plurality of different tabs that can be selected to filter content. In the example shown in FIG. 24, the "All" tab is selected in pane 532 to show all of the user's content in the form of a plurality of different digital cards displayed in digital card display pane 534. Each digital card includes a name in a name column 536, a date modified in a modified column 538, tags that are applied to the digital card in a tags column 540, an owner who created or owns the underlying item corresponding to the digital card in owner column 542, and any activities that have been performed with respect to the digital card as indicated in activity column 544.

Pane 532 also includes a tags section 546 that identifies all of the tags that have been applied to the content displayed in pane 530. The user can select one of the tags (such as by clicking on it, tapping it using a touch gesture, etc.) to filter the digital cards displayed in display pane 530 to those that have been tagged with the selected tag.

FIG. 24 also shows one way in which a user can manage tags applied to the digital cards displayed in pane 530. It can be seen that the user has opened a menu 548 (such as by right clicking or otherwise actuating the user interface) which includes a tag actuator 550. FIG. 24 also shows that the user has actuated the tag actuator 550 which opens another menu 552. Menu 552 includes a text field 554 where the user can enter a text string to create a new tag or to find an existing tag. Menu 552 also includes a tag display portion 556 that displays the tags that are available to the user. By entering text into text field 554, or by actuating one of the tag actuators 556 in display portion 556, the user can apply a tag to a selected digital card in display pane 530. It will be noted that using dropdown menus and actuators in this way in order to manage tags with respect to digital cards is only one example, and a wide variety of other mechanisms can be used on the user interface in order to manage tags on digital cards as well.

Figure 25:
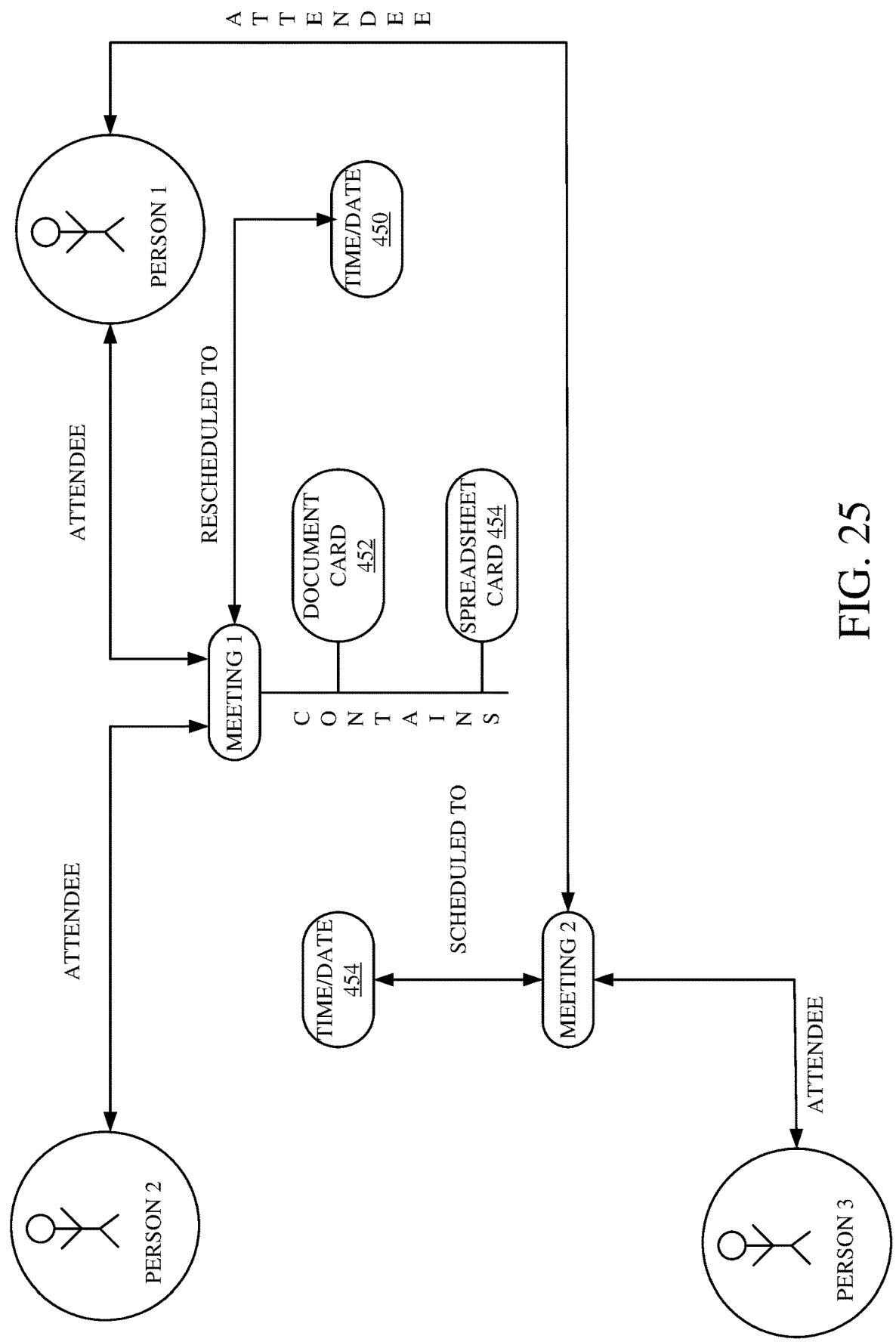
FIG. 25 shows one example of how time is modeled.
Figure 26:
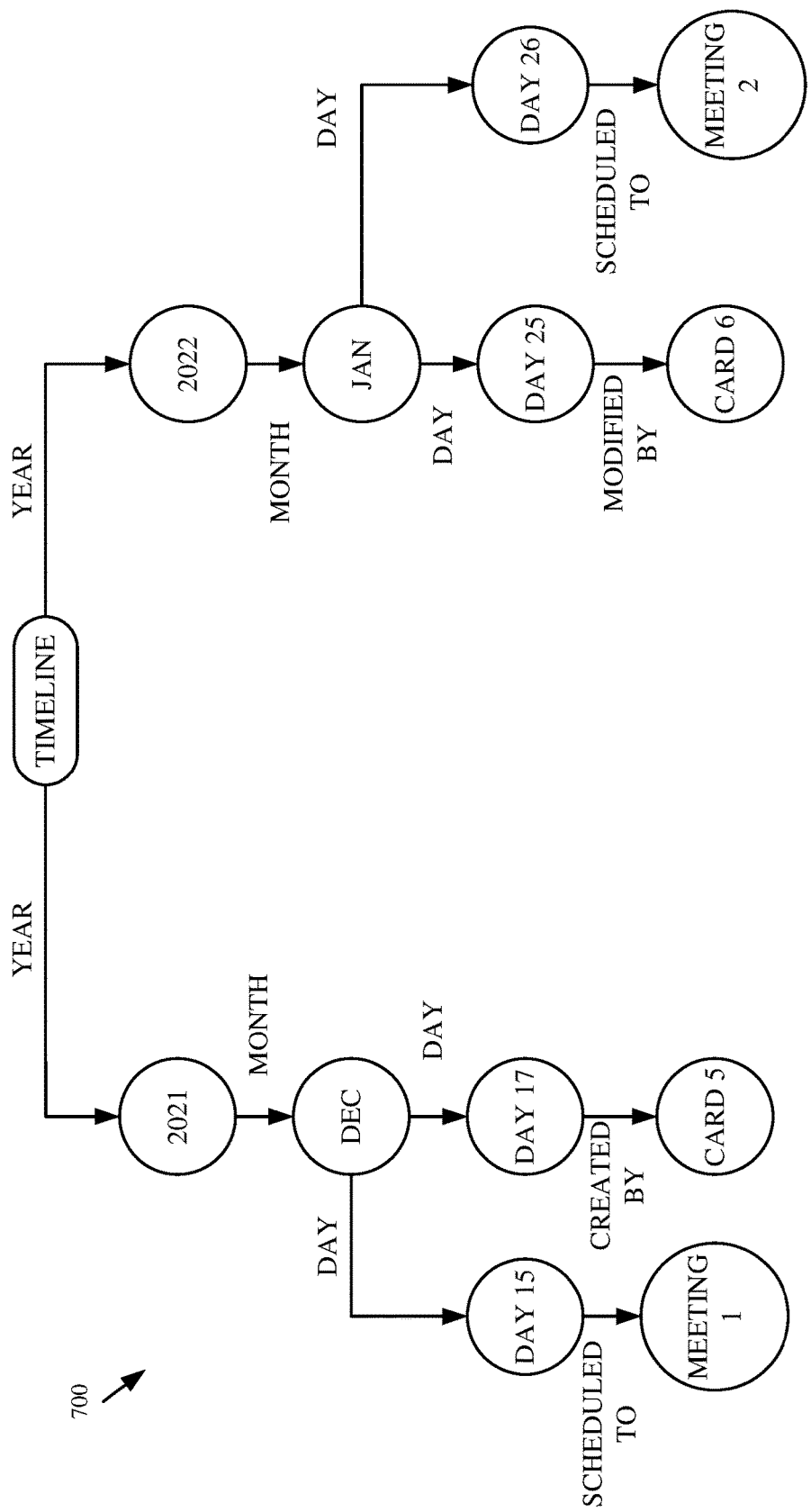
FIG. 26 shows an example of how time is modeled.

FIGS. 25 and 26 shows different ways that graph management system 130 can model time in the graphs 126. FIG. 25 shows an example in which time is represented as a single node. That is, a meeting can be scheduled on a time, a digital card can be modified on a time, an event digital card may start on a time, etc. FIG. 25, for instance, shows that meeting 1 has been rescheduled to a time and date represented by node 450. The meeting has a plurality of digital cards 452 and 454 contained within it. Meeting 1 also has a plurality of attendees (represented by nodes for person 1 and person 2). Also, FIG. 25 shows that meeting 2 has been scheduled to a time represented by digital card 454 and has two attendees, person 1 and person 3. Representing time in such a way may be desired whenever it is needed to know when something happened or will happen on a timeline. For instance, representing time as shown in FIG. 25 facilitates such queries as "What cards were created at time X?" and "Do I have a meeting at time Y?".

FIG. 26, however, is a depiction 700 that represents time in graphs 126 in a different way. In FIG. 26, a timeline tree is formed by breaking down the time and date into smaller nodes. For instance, FIG. 26 shows that the timeline node can be broken into year nodes where year 2021 and 2022 are each represented by a node in the graph. Each year can be broken down into month nodes and each month can be broken down into day nodes. Each of the time nodes in the representation shown in FIG. 26 can have associated digital cards. The structures shown in FIG. 26, in which the time is broken into a timeline, allows different types of queries, such as queries that search for things that occurred within a time range between specified dates, and queries that are for the aggregation of information using dates or time. Some examples of queries that can be supported when modeling time as shown in FIG. 26 include such queries as "How many meetings did I have on 1-26-22?", "What were the digital cards created in January?", "What date was my digital card 6 modified?" and "How many meetings did I have between Dec. 15, 2021 and Jan. 26, 2022?".

It can thus be seen that the present description describes a system which can be used to generate and store digital cards, representing heterogeneous underlying digital objects, in a decentralized data storage system. The present description also describes a system for tagging and managing tags with respect to the digital cards, thus enabling the system to perform additional processing functionality with respect to the digital cards, such as sorting and grouping of digital cards across the de-centralized data storage system based on the tags. The decentralized data storage system, itself, handles the security, authentication, and access control to the digital cards, and a digital card accessing system (e.g., an SDK) exposes an interface that allows users to access the stored digital cards from multiple different data storage systems and view them as if they are on a single data storage system, thus reducing the need for a user system to perform multiple different queries across the decentralized data storage system and also reducing the need to replicate the digital cards across multiple different data storage systems. A metafolder system generates graphs corresponding to the digital cards and tags to show activities performed with respect to the digital cards and relationships among the digital cards and tags applied to the digital cards. Thus, projections can be generated based on queries against the graphs.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores and file stores have also been discussed. It will be noted the data store or file store can each be broken into multiple data stores or file stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, generators, components, and/or logic. It will be appreciated that such systems, generators, components and/or logic can be comprised of hardware items (such as processors and associated memory, or other processing components, some of which are described below) that perform the functions associated with those systems, components and/or logic. In addition, the systems, generators, components and/or logic can be comprised of software that is loaded into a memory and is subsequently executed by a processor or server, or other computing component, as described below. The systems, generators, components and/or logic can also be comprised of different combinations of hardware, software, firmware, etc., some examples of which are described below. These are only some examples of different structures that can be used to form the systems, generators, components and/or logic described above. Other structures can be used as well.

Figure 27:
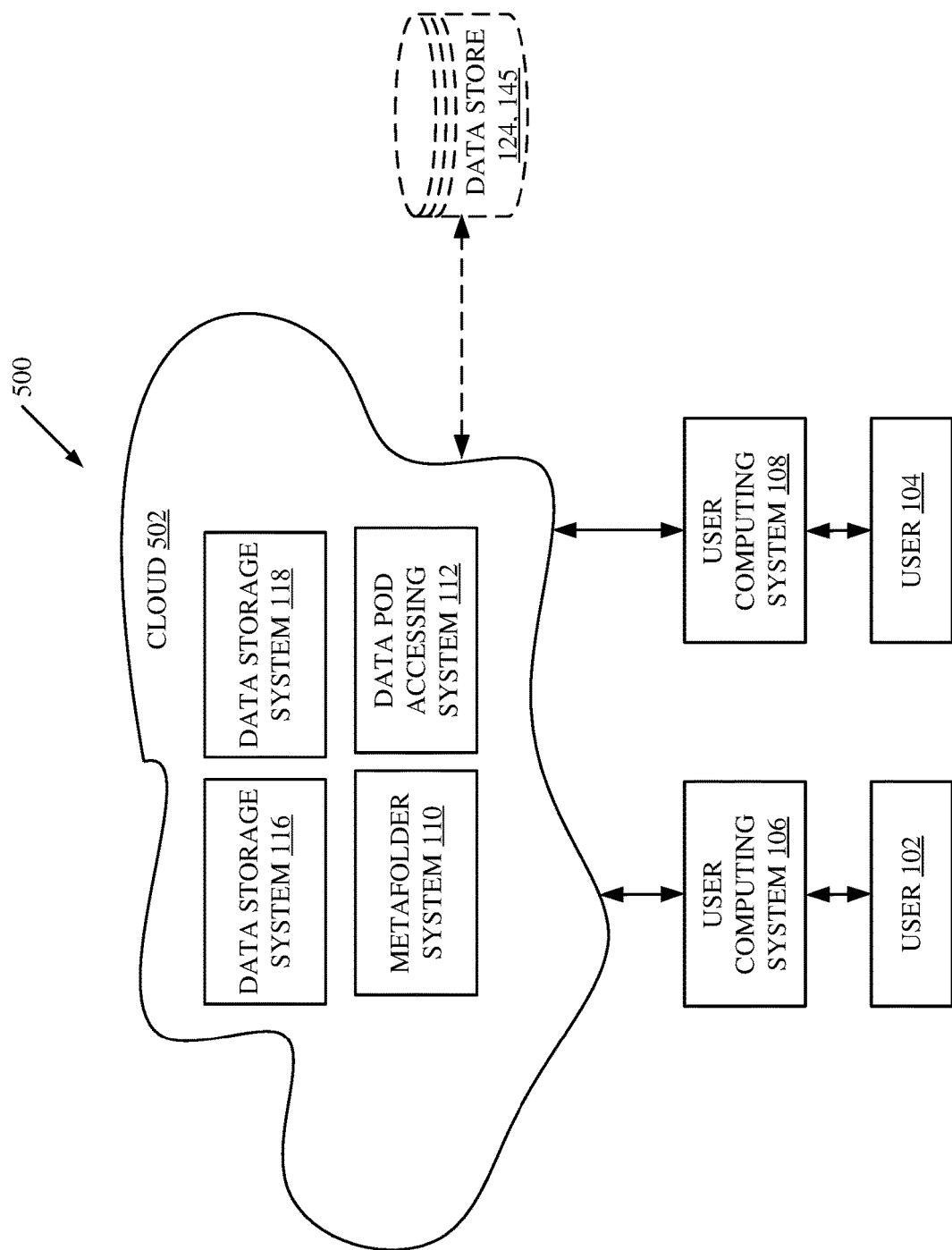
FIG. 27 shows one example of a computing system architecture deployed in a remote server architecture.

FIG. 27 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software, systems, processors or other components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 27, some items are similar to those shown in FIG. 1 and they are similarly numbered. FIG. 27 specifically shows that de-centralized data storage system architecture 115, metafolder system 110, data pod accessing system 112, and content aggregation system 114 can be located in cloud 502 (which can be public, private, or a combination where portions are public while others are private). Therefore, users 102-103 use user computing systems 106-108 to access those systems through cloud 502.

FIG. 27 also depicts another example of a cloud architecture. FIG. 27 shows that it is also contemplated that some elements of architecture 100 are disposed in cloud 502 while others are not. By way of example, file stores 124, 145 can be disposed outside of cloud 502, and accessed through cloud 502. Regardless of where they are located, the items can be accessed directly by systems 106-108, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 28:
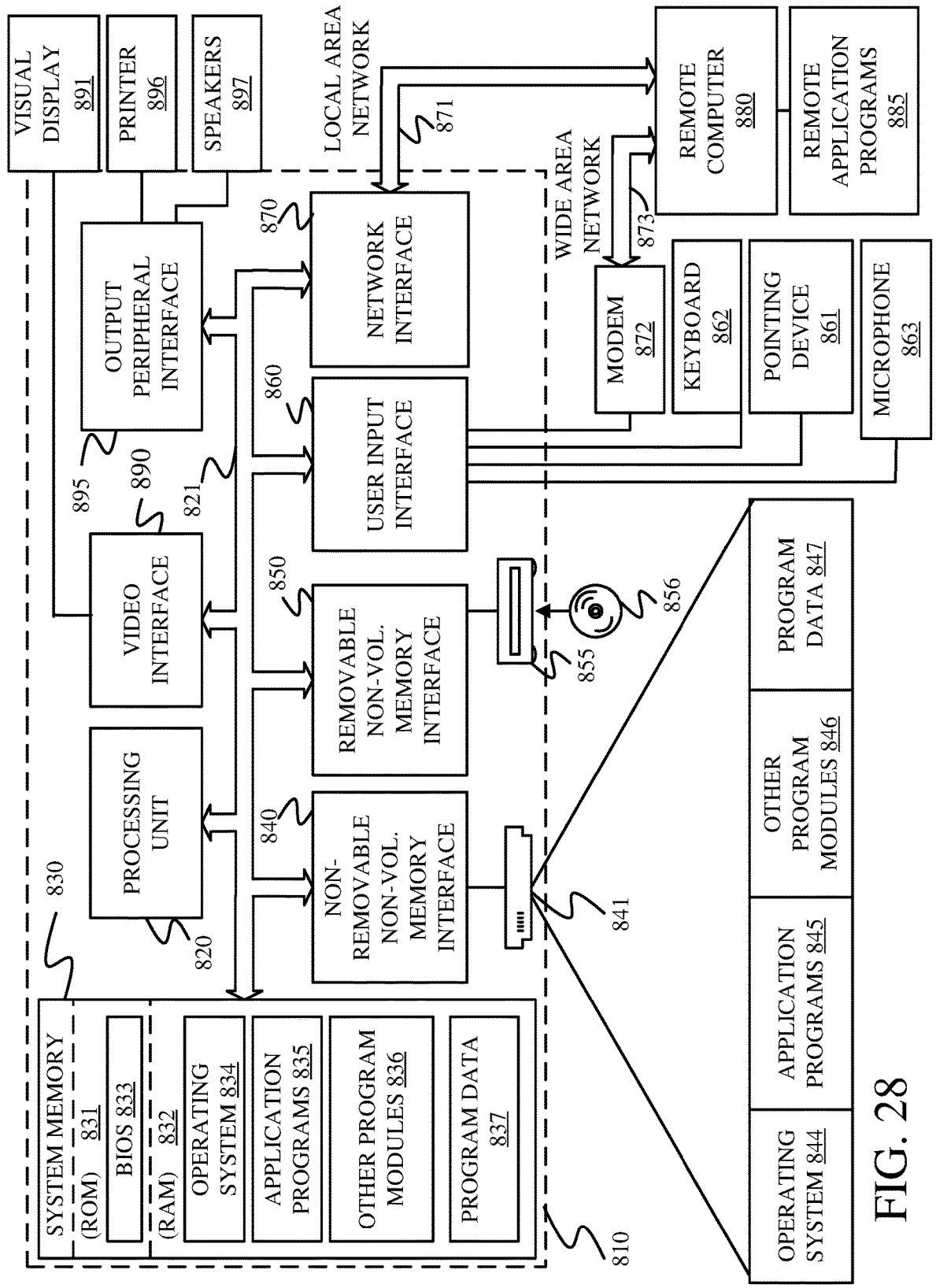
FIG. 28 is a block diagram of one example of a computing environment.

FIG. 28 is one example of a computing environment in which architecture 100, or parts of it, (for example) can be deployed. With reference to FIG. 28, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 28.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 28 illustrates operating system 834, application programs 835, other program modules 836, and program data 837.

The computer 810 may also include other removable/non-removable volatile/nonvolatile computer storage media. By way of example only, FIG. 28 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 28, provide storage of computer readable instructions, data structures, program modules and other data for the computer 810. In FIG. 28, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 28 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 28 illustrates remote application programs 885 as residing on remote computer 880. It will be appreciated that the network connections shown are examples and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:
  detecting, at a data pod accessing system, an input request to create a digital card representing a digital item;
  obtaining digital item metadata corresponding to the digital item;
  generating the digital card including the digital item metadata;
  generating a card output to store the digital card in a data pod, comprising a plurality of digital cards in a given data storage system of a plurality of data storage systems in a de-centralized data storage system architecture;
  detecting a tag input identifying a selected digital card, of the plurality of digital cards, to tag with a tag;
  generating a graph corresponding to the selected digital card, the graph including a tag node representing the tag and a digital card node representing the selected digital card, and a relationship portion identifying that the tag is applied to the selected digital card to obtain a tagged digital card; and
  exposing, at the data pod accessing system, an interface to access a set of digital cards, of the plurality of digital cards stored on the de-centralized data storage system architecture, through the data pod accessing system.

Example 2 is the computer implemented method of any or all previous examples and further comprising:
  receiving, from a first context through the exposed interface, a first projection request input requesting a projection of a set of the plurality of digital cards including the tagged digital card;
  traversing the graph based on the first projection request input to identify a responsive set of digital cards including the tagged digital card to return in response to the first projection request input; and
  generating a projection of the responsive set of digital cards including the tagged digital card for the first context showing a visual representation of the tag.

Example 3 is the computer implemented method of any or all previous examples and further comprising:
  receiving, from a second context through the exposed interface, a second projection request input requesting a projection of a set of the plurality of digital cards including the tagged digital card;
  traversing the graph based on the second projection request input to identify a responsive set of digital cards including the tagged digital card to return in response to the second projection request input; and
  generating a projection of the responsive set of digital cards including the tagged digital card for the second context showing a visual representation of the tag.

Example 4 is the computer implemented method of any or all previous examples wherein the first projection request input includes a filter request to filter the plurality of digital cards based on the tag and wherein traversing the graph comprises:
  traversing the graph to identify, as the responsive set of digital cards, digital cards that are tagged with the tag.

Example 5 is the computer implemented method of any or all previous examples wherein generating a projection comprises:
  accessing sort criteria based on sort metadata corresponding to the tag;

sorting the responsive set of digital cards based on the sort criteria to obtain a set of sorted digital cards; and
generating the projection based on the set of sorted digital cards.

Example 6 is the computer implemented method of any or all previous examples wherein the sort criteria are context-dependent sort criteria and wherein accessing sort criteria comprises:
identifying that the first projection request input is from the first context; and
accessing the context-dependent sort criteria corresponding to the first context.

Example 7 is the computer implemented method of any or all previous examples and further comprising:
detecting a tag creation input to create a new tag;
creating the new tag based on the tag creation input; and
modifying the graph to indicate that the new tag has been created.

Example 8 is the computer implemented method of any or all previous examples wherein the tag creation input comprises a tag identifier string and visual indicia visually distinguishing the new tag from other tags.

Example 9 is the computer implemented method of any or all previous examples wherein the tag creation input comprises a priority indicator indicating priority of the new tag relative to other tags.

Example 10 is the computer implemented method of any or all previous examples and further comprising:
identifying tagging criteria;
determining whether a tag is to be automatically generated based on the identified tagging criteria; and
if so, automatically generating the tag input.

Example 11 is the computer implemented method of any or all previous examples wherein the tagging criteria comprise context criteria and wherein determining whether a tag is to be automatically created comprises:
determining whether a new digital card is created based on a digital item in a specified context; and if so, automatically generating the tag input comprises automatically generating the tag input to tag the new digital card with a tag identifying the specified context.

Example 12 is the computer implemented method of any or all previous examples wherein the tagging criteria comprise relevance criteria and wherein determining whether a tag is to be automatically created comprises:
determining whether any of the plurality of digital cards are similar to one another based on contents of the digital items corresponding to the plurality of digital cards and, if so, automatically generating the tag input comprises automatically generating the tag input to tag the digital cards that are similar to one another with a tag identifying the similar digital cards.

Example 13 is a computer system, comprising
at least one processor; and
a memory that stores computer executable instructions which, when executed by the at least one processor, cause the at least one processor to implement:
a data pod accessing system configured to generate a first digital card and a second digital card, the first digital card representing a first type of digital item and the second digital card representing a second type of digital item, the first type being different from the second type, and store the first and second digital cards in data pods in a de-centralized data storage system;
a graph management system configured to generate a graph with a first node corresponding to the first digital card and a second node corresponding to the second digital card, the graph including a tag node corresponding to a tag;
a tag management component detecting a tag input identifying the first digital card as a selected digital card to tag with the tag, the graph management system modifying the graph to indicate that the first digital card is tagged by the tag;
a filtering system receiving a projection request input requesting a projection of digital cards, filtered based on the tag, and traversing the graph to identify that the first digital card is tagged by the tag; and
a projection generation system configured to generate the projection of the first digital card.

Example 14 is the computer system of any or all previous examples wherein the projection request input comprises a first projection request input from a calling application in a first context and wherein the projection generation system generates the projection as a first projection, showing the tag in the first context, and wherein the projection generation system receives a second projection request input from a calling application in a second context and wherein the projection generation system generates the projection as a second projection, showing the tag in the second context.

Example 15 is the computer system of any or all previous examples wherein the tag management system comprises:
a tag creation system that receives a tag creation input including a string identifier and visual indicia that visually distinguishes the tag from other tags and that generates a tag creation output, the graph management system generating the tag node with metadata indicative of the string identifier and the visual indicia.

Example 16 is the computer system of any or all previous examples wherein the projection generation system generates the projection based on the visual indicia.

Example 17 is the computer system of any or all previous examples wherein the tag management system comprises:
a system-generated tagging system configured to evaluate tag criteria to determine that the first digital card is to be tagged with the tag and to automatically generate the tag input to the tag management system.

Example 18 is a computing system, comprising:
at least one processor; and
a memory that stores computer executable instructions which, when executed by the at least one processor, cause the at least one processor to perform steps comprising:
detecting, at a data pod accessing system, an input request to create a digital card representing a digital item;
obtaining digital item metadata corresponding to the digital item;
generating the digital card including the digital item metadata;
generating a card output to store the digital card in a data pod, comprising a plurality of digital cards in a given data storage system of a plurality of data storage systems in a de-centralized data storage system architecture;
detecting a tag input identifying a selected digital card, of the plurality of digital cards, to tag with a tag;
generating a graph corresponding to the selected digital card, the graph including a tag node representing the tag and a digital card node representing the selected digital card, and a relationship portion identifying that the tag is applied to the selected digital card to obtain a tagged digital card;

exposing, at the data pod accessing system, an interface to access a set of digital cards, of the plurality of digital cards stored on the de-centralized data storage system architecture, through the data pod accessing system; and generating a projection of a responsive set of digital cards, responsive to a first projection request input received through the interface from an application in a first context, including the tagged digital card for the first context showing a visual representation of the tag.

Example 19 is the computing system of any or all previous examples and further comprising:

receiving, from the first context through the exposed interface, the first projection request input requesting a projection of a set of the plurality of digital cards including the tagged digital card; and traversing the graph based on the first projection request input to identify the responsive set of digital cards including the tagged digital card to return in response to the first projection request input.

Example 20 is the computing system of any or all previous examples and further comprising:

receiving, from a second context through the exposed interface, a second projection request input requesting a projection of a set of the plurality of digital cards including the tagged digital card;

traversing the graph based on the second projection request input to identify a responsive set of digital cards including the tagged digital card to return in response to the second projection request input; and generating a projection of the responsive set of digital cards including the tagged digital card for the second context showing a visual representation of the tag.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   detecting an input request to create a digital card representing a digital item;
   obtaining digital item metadata corresponding to the digital item;
   generating the digital card including the digital item metadata, wherein the digital card does not include the digital item;
   generating a card output to store the digital card in a data pod in a given digital card data storage system of a plurality of digital card data storage systems in a de-centralized digital card data storage system architecture, each respective digital card data storage system, of the plurality of digital card data storage systems, having one or more data pods storing one or more digital cards, wherein each of the one or more digital cards represents a digital item stored in a digital item data storage system of a plurality of digital item data storage systems having a plurality of types of security control;
   detecting a tag input identifying a selected digital card, of a plurality of digital cards stored on the de-centralized digital card data storage system architecture, to tag with a tag;
   generating a graph corresponding to the selected digital card, the graph including a tag node representing the tag and a digital card node representing the selected digital card, and a relationship portion identifying that the tag is applied to the selected digital card to obtain a tagged digital card;
   exposing an interface to access, through the data pod accessing system based on the graph, a set of digital cards of the plurality of digital cards stored on the de-centralized digital card data storage system architecture, wherein at least some of the set of digital cards are spread out across the decentralized digital card data storage system and are stored on different digital card data storage systems of the plurality of digital card data storage systems
   generating a set of projections of the set of digital cards for representing digital items associated with the set of digital cards, and
   presenting, via the interface, the set of projections of the set of digital cards spread out across the de-centralized digital card data storage system architecture as if originating from one logical location, wherein the set of projections are generated and presented without interfacing with the security controls of the plurality of digital item data storage systems.

2. The computer implemented method of claim 1, wherein generating the set of projections includes:
   receiving, from a first context through the exposed interface, a first projection request input requesting a projection of one or more digital cards of the plurality of digital cards including the tagged digital card;
   traversing the graph based on the first projection request input to identify a subset of digital cards responsive to the first projection request input; and
   generating a projection of the subset of digital cards including the tagged digital card for the first context.

3. The computer implemented method of claim 2 and further comprising:
   presenting the projection to the user via a graphical user interface of a client device.

4. The computer implemented method of claim 2 wherein the first projection request input includes a filter request to filter the plurality of digital cards based on the tag and wherein traversing the graph comprises:
   traversing the graph to identify, as the subset of digital cards, digital cards that are tagged with the tag.

5. The computer implemented method of claim 4 wherein generating the projection comprises:
   accessing sort criteria based on sort metadata corresponding to the tag;
   sorting the subset of digital cards based on the sort criteria to obtain a set of sorted digital cards; and
   generating the projection based on the set of sorted digital cards.

6. The computer implemented method of claim 5 wherein the sort criteria are context-dependent sort criteria and wherein accessing sort criteria comprises:
   identifying that the first projection request input is from the first context; and
   accessing the context-dependent sort criteria corresponding to the first context.

7. The computer implemented method of claim 1 and further comprising:
   detecting a tag creation input to create a new tag;
   creating the new tag based on the tag creation input; and
   modifying the graph to indicate that the new tag has been created.

8. The computer implemented method of claim 7 wherein the tag creation input comprises a tag identifier string and visual indicia visually distinguishing the new tag from other tags.

9. The computer implemented method of claim 8 wherein the tag creation input comprises a priority indicator indicating priority of the new tag relative to other tags.

10. The computer implemented method of claim 1 wherein the plurality of digital tags are digital representations of a plurality of heterogenous digital objects, and wherein the plurality of digital tags include metadata for the plurality of heterogenous digital objects without including the underlying data of the plurality of heterogenous digital objects.

11. The computer implemented method of claim 1, wherein the interface is configured to interact with the plurality of digital cards without directly accessing the data in the digital cards.

12. The computer implemented method of claim 1 wherein the plurality of digital cards are stored on the decentralized digital card data storage system architecture without replicating the digital cards across multiple different data storage systems.

13. A computer system, comprising:
at least one processor; and
a memory that stores computer executable instructions which, when executed by the at least one processor, cause the at least one processor to implement:
a data pod accessing system configured to generate a first digital card and a second digital card, the first digital card representing a first type of digital item stored in a first digital item storage system having a first type of security control and the second digital card representing a second type of digital item stored in a second digital item storage system having a second type of security control, the first type of digital item being different from the second type of digital item, and interact with a de-centralized data storage system to store the first and second digital cards in the de-centralized data storage system, wherein the first and second digital cards are stored in different data storage systems in the de-centralized data storage system, wherein neither the first digital card nor the second digital card includes the digital item, and wherein at least some of the set of digital cards are spread out across the decentralized digital card data storage system and are stored on different digital card data storage systems of the plurality of digital card data storage systems;
a graph management system configured to generate a graph with a first node corresponding to the first digital card and a second node corresponding to the second digital card, the graph including a tag node corresponding to a tag;
a tag management component detecting a tag input identifying the first digital card as a selected digital card to tag with the tag, the graph management system modifying the graph to indicate that the first digital card is tagged by the tag;
a filtering system receiving a projection request input requesting a projection of digital cards, filtered based on the tag, and traversing the graph to identify that the first digital card is tagged by the tag; and
a projection generation system configured to generate the projection of the first digital card without interfacing with the first type of security control of the first digital item storage system.

14. The computer system of claim 13 wherein the projection request input comprises a first projection request input from a calling application in a first context and wherein the projection generation system generates the projection as a first projection, showing the tag in the first context, and wherein the projection generation system receives a second projection request input from a calling application in a second context and wherein the projection generation system generates the projection as a second projection, showing the tag in the second context.

15. The computer system of claim 13 wherein the tag management system comprises:
a tag creation system that receives a tag creation input including a string identifier and visual indicia that visually distinguishes the tag from other tags and that generates a tag creation output, the graph management system generating the tag node with metadata indicative of the string identifier and the visual indicia.

16. The computer system of claim 15 wherein the projection generation system generates the projection based on the visual indicia.

17. The computer system of claim 13 wherein the tag management system comprises:
a system-generated tagging system configured to evaluate tag criteria to determine that the first digital card is to be tagged with the tag and to automatically generate the tag input to the tag management system.

18. A computing system, comprising:
at least one processor; and
a memory that stores computer executable instructions which, when executed by the at least one processor, cause the at least one processor to perform steps comprising:
detecting, an input request to create a digital card representing a digital item;
obtaining digital item metadata corresponding to the digital item;
generating the digital card including the digital item metadata, wherein the digital card does not include the digital item;
generating a card output to store the digital card in a data pod in a given digital card data storage system of a plurality of digital card data storage systems in a de-centralized digital card data storage system architecture, each respective digital card data storage system of the plurality of digital card data storage systems having one or more data pods storing one or more digital cards, wherein each of the one or more digital cards represents a digital item stored in a digital item data storage system of a plurality of digital item data storage system having a plurality of types of security control;
detecting a tag input identifying a selected digital card, of the plurality of digital cards stored on the de-centralized digital card data storage system architecture, to tag with a tag;
generating a graph corresponding to the selected digital card, the graph including a tag node representing the tag and a digital card node representing the selected digital card, and a relationship portion identifying that the tag is applied to the selected digital card to obtain a tagged digital card;
exposing an interface to access, through the data pod accessing system based on the graph, a set of digital cards of the plurality of digital cards stored on the de-centralized digital card data storage system architecture, wherein at least some of the set of digital cards are spread out across the decentralized digital card data storage system and are stored on different digital card data storage systems of the plurality of digital card data storage systems; and generating a set of projections of the set of digital cards for representing digital items associated with the set of digital cards; and presenting, via the interface, the set of projections of the set of digital cards spread out across the decentralized digital card data storage system architecture as if originating from one logical location, wherein the set of projections are generated and presented without interfacing with the security controls of the plurality of digital item data storage systems.

19. The computing system of claim 18, wherein generating the set of projections includes:

receiving, from a first context through the exposed interface, the first projection request input requesting a projection of one or more digital cards of the plurality of digital cards including the tagged digital card;

traversing the graph based on the first projection request input to identify a subset of digital cards responsive to the first projection request input; and generating a projection of the subset of digital cards including the tagged digital card for the first context.

* * * * *